United States Patent [19]
Turpin

[11] Patent Number: 5,640,501
[45] Date of Patent: Jun. 17, 1997

[54] DEVELOPMENT SYSTEM AND METHODS FOR VISUALLY CREATING GOAL ORIENTED ELECTRONIC FORM APPLICATIONS HAVING DECISION TREES

[75] Inventor: William Monroe Turpin, Santa Cruz, Calif.

[73] Assignee: Borland International, Inc., Scotts Valley, Calif.

[21] Appl. No.: 132,676

[22] Filed: Oct. 6, 1993

Related U.S. Application Data

[63] Continuation of Ser. No. 606,537, Oct. 31, 1990, abandoned.

[51] Int. Cl.$^6$ ............................................. G06F 17/30
[52] U.S. Cl. ........................ 395/768; 395/601; 395/352
[58] Field of Search ........................ 395/145, 148, 395/149, 157, 155–156, 159, 600; 364/408, 401

[56] References Cited

U.S. PATENT DOCUMENTS

| | | | |
|---|---|---|---|
| 4,710,763 | 12/1987 | Franke et al. | 340/723 |
| 4,733,354 | 3/1988 | Potter et al. | 364/415 |
| 4,821,211 | 4/1989 | Torres | 364/521 |
| 4,831,580 | 5/1989 | Yamada | 364/900 |
| 4,866,634 | 9/1989 | Reboh et al. | 364/513 |
| 4,912,669 | 3/1990 | Document-Editing System | 364/900 |
| 4,956,773 | 9/1990 | Saito et al. | 364/200 |
| 4,982,344 | 1/1991 | Jordon | 364/521 |
| 4,984,180 | 1/1991 | Wada et al. | 364/518 |
| 5,008,810 | 4/1991 | Kessel et al. | 364/200 |
| 5,047,960 | 9/1991 | Sloan | 364/523 |
| 5,091,868 | 2/1992 | Pickens et al. | 395/148 |
| 5,179,652 | 1/1993 | Rozmauith et al. | 395/155 |
| 5,208,907 | 5/1993 | Shelton et al. | 395/149 |

FOREIGN PATENT DOCUMENTS

| | | |
|---|---|---|
| 0211151 | 2/1987 | European Pat. Off. . |

OTHER PUBLICATIONS

Pezold, C., *Programming Windows*, Second Edition, Microsoft Press, 1990, pp. 809–840 (Chapter 17: Dynamic Data Exchange (DDE)).

Gehani, N., *High Level Form Definition in Office Information Systems*, The Computer Journal, vol. 26, No. 1, Feb. 1993, pp. 52–59.

Butterworth, M., *Forms Definition Methods*, 5th Annual Conference on Computers and Communications, Mar. 1986, pp. 708–712.

DeMaria et al; *Working With dBase Mac*; 1988; pp. 95–134, 155–183.

Shu; *Visual Programming*; 1988; pp. 16–31, 142–147, 150–151, 202–209, 222–229, 234–237, 264–283.

Miyao et al; "Visualized and Modeless Programming Environment . . . ", 1989, pp. 99–102.

Smith, "Visual Programming in the Interface Construction Set", 1988, pp. 109–120.

*Primary Examiner*—Heather R. Herndon
*Assistant Examiner*—J. Feild
*Attorney, Agent, or Firm*—John A. Smart; Michael J. Ritter

[57] ABSTRACT

A system for creation and completion of goal oriented electronic forms creates a graphical image data file which defines: a graphical image of a form for display and printing; a graphical image of tree branches, tree nodes, and conclusions in association with fields of the form; reading and writing links between form fields and data sources and destinations; and links to other forms which, with the original form, comprise a related stack of forms. The system includes a form creation mode and a run time mode. The trees are defined by an application developer using the form creation mode to establish both qualitative and quantitative relationships between the various fields on the forms thereby providing the basis for the goal oriented prompting for the application user using the run time mode.

9 Claims, 25 Drawing Sheets

APPLICATION PROGRAM

300

| FORM TOOL (FORM CREATION) | 301 |
| TREE TOOL (FORM CREATION) | 302 |
| LINK TOOL (FORM CREATION) | 303 |
| STACK TOOL (FORM CREATION) | 304 |
| MEMORY MANAGER | 305 |
| FORM EXECUTION (RUN TIME) | 306 |
| TREE EXECUTION (RUN TIME) | 307 |
| LINK MANAGER | 308 |
| FILE I-O SUBSYSTEM | 309 |
| WINDOWS INTERFACE | 310 |

*FIG. 3*

FORM IMAGE DATA FILE

400

```
BOF
IGNORE REMOTE
FORMNAMES
FIELDNAMES
FONTNAMES

FOR EACH FORM
    FORMSIZE

FOR EACH FORM OBJECT
        FORMFIELD, FORMTEXT,
        FORMPICTURE, OR FORMPATTERN

FOR EACH FIELD
        FIELD TREE
        FIELDHELP
        FIELDEXPECT
        FIELDVALUE

FOR EACH LINK
        DBASE_LINK
        DDE_LINK
        ACSII_LINK
EOF
```

*FIG. 4*

Apex Life Insurance Company

| Proposed Insured | | | | |
|---|---|---|---|---|
| Residence address | | City | State | Zip code |
| Sex ☐M ☐F | Birthdate | Birthplace | | Residence telephone |
| Beneficiary name | | | Relationship to insured | |
| Beneficiary address | | | | |
| Total annual premium | Premium payment amount | | | |
| ☐ Insured does not meet basic qualifications | | | ☐ Temporary insurance not available | |
| ☐ Insured may be subject to substandard rating | | | ☐ Policy may require exclusion rider | |
| ☐ Medical exam required | | | Deposit required | Deposit received |
| Signature › | | | | |

FIG. 9

| Amount of basic policy | Policy kind | Age used to calculate premium | ☐ Non-smoker |
|---|---|---|---|
| ☐ Participating | Par policy dividend option<br>☐ Applied to premium<br>☐ Paid to insured | ☐ Purchase paid-up additions<br>☐ Leave on deposit | |
| UL planned premium | | | |
| | ☐ Premium waiver on basic policy | Basic plan premium | |
| | Accidental death rider amount | ADB premium | |
| | Term insurance rider amount | YRT premium | |
| | ☐ Premium waiver on riders | Waiver premium | |
| Date of first annuity payment | | Total annual premium | |
| Mode of payment<br>☐ Annually<br>☐ Semi-annually<br>☐ Quarterly<br>☐ Monthly | | | Premium payment amount |

*FIG. 10*

| | |
|---|---|
| Have you: | |
| In the past 12 months had any known or suspected heart attack, stroke, or cancer, other than of the skin, or been treated by any physician or other practitioner for any of these conditions? | ☐ Yes ☐ No |
| Within the last 60 days been advised by any physician or other practitioner to have any diagnostic test or surgery not yet performed? | ☐ Yes ☐ No |
| Have you smoked cigarettes in the last 12 months? | ☐ Yes ☐ No |
| Have you used tobacco in any other form in the last 12 months? | ☐ Yes ☐ No |
| Will any existing life or annuity coverage be replaced, lapsed or surrendered? | ☐ Yes ☐ No |
| Do you have any other application pending for life insurance? | ☐ Yes ☐ No |
| Are you in the Reserves, National Guard, on active duty in the military, or enrolled in a college military program? | ☐ Yes ☐ No |
| Have you in the last three years engaged in or do you plan to engage in any of the following activities?  ☐ Motorized vehicle racing   ☐ Mountain climbing   ☐ Scuba diving | |

FIG. 11

| Height (inches) | Weight | Has your weight changed more than 10 pounds in the last year? ☐ Yes ☐ No |
|---|---|---|
| Are you at the present time taking any medications? | | ☐ Yes ☐ No |
| Are you presently under a doctor's care for any condition? | | ☐ Yes ☐ No |
| Have you ever had any operations? | | ☐ Yes ☐ No |
| Have any operations ever been advised but not performed? | | ☐ Yes ☐ No |
| Do you have any impairment of sight or hearing? | | ☐ Yes ☐ No |
| Have you had an electrocardiogram or x-ray made in the last five years? | | ☐ Yes ☐ No |
| Has a parent or sibling ever had heart disease, high blood pressure or diabetes? | | ☐ Yes ☐ No |
| Remarks | | |

| DecisionForm - LIFE.DF | | | | | |
|---|---|---|---|---|---|
| File | Edit | Form | Field | View | Tools | Help |

Premium Calculation [Goal]

| Amount of basic policy | Policy kind | Age used to calculate premium |
|---|---|---|
| $100,000.00 | WL-89 | 34 |

☒ Participating

Par policy dividend option
☒ Applied to premium     ☐ Purchase paid-up additions
☐ Paid to insured          ☐ Leave on deposit ☐ UL planned premium ☐ Premium waiver on basic policy          Basic plan premium     $1,210.00

Accidental death rider amount              ADB premium            $74.00
$100,000.00

Term insurance rider amount                YRT premium            $185.00
$100,000.00

☒ Premium waiver on riders                 Waiver premium         $90.00

Date of first annuity payment              Total annual premium   $1,559.00

Mode of payment
☐ Annually  ☐ Semi-annually  ☐ Quarterly  ☒ Monthly

Premium payment amount                     $136.41

FIG. 20

DEVELOPMENT SYSTEM AND METHODS FOR VISUALLY CREATING GOAL ORIENTED ELECTRONIC FORM APPLICATIONS HAVING DECISION TREES

This is a Continuation of application Ser. No. 07/606,537, filed Oct. 31, 1990, now abandoned.

TECHNICAL FIELD

This invention relates to the generation and completion of electronically automated forms.

BACKGROUND OF THE INVENTION

Forms to gather data are employed daily in almost every commercial activity, in schools, and in all levels of government activity. It is a rare occurrence that an individual's life is not frequently touched by many forms. In the past, forms have been prepared by many processes ranging from hand and typewriter printed forms to engraved and mass produced forms. Prior to the advent of pervasive computing facilities, forms were completed by hand or by a typewriter and were generally interpreted by an individual. Today, there are many software packages which are capable of creating very fine printed forms. The recent proliferation of "Desk top publishing" software and of laser and inkjet printers has brought creation of good printed forms within the reach of individuals with high end personal computers as well as businesses.

Today, many electronic forms are completed by individuals using a keyboard and/or a mouse or other pointing device; the data thus gathered is possibly stored for later reference; and a report is printed for an immediate purpose.

In prior art systems known to me, to the extent that forms provide prompting of fields to be completed, the fields are presented in sequence without regard for the data entered in the course of completing the form. If a form is extensive, there may be prompting for information which is not relevant in the context of the answers which have been entered. This is wasteful of operator time since unnecessary information is often requested.

In the prior art, in order to avoid prompting for unnecessary information, a first limited form is presented for completion; the entries on that form are evaluated by an individual; and a decision is made to require completion of one or more additional forms. Since there is no automatic prompting for completion of additional forms which are dictated by answers on the completed form, the operator is unduly burdened with the decision process; and operator time is wasted.

Additionally, forms are often used to describe and organize a complex decision process or "business policy". As such, the form contains blanks for both the inputs and results of the decision process. However, the form itself it typically very poor at describing the decision process other than by including notes in the margins. For this reason, many forms are accompanied by an instruction sheet, or "policy manual", which the operator must read, interpret, and apply in the process of completing the form. This is wasteful of operator time, makes it harder to disseminate new decision processes, and results in many forms being completed incorrectly. This weakness of paper forms is not effectively addressed by current form software packages.

DISCLOSURE OF THE INVENTION

In accordance with my invention, I provide a system for generating and using form data files which define: (a) a graphical image of a goal oriented form for display on a monitor; and (b) a graphical image of at least one decision tree comprised of branches and conclusions which are discretely associated with fields of the form and which define logical and/or mathematical operations which implement goal oriented prompting within a form and among forms of a set of forms.

Further, in accordance with my invention, my system for generating form data files defines: (c) reading and writing links between fields of the form and a variety of data sources and destinations; and (d) other forms which, with the subject form, comprise a related set or "stack" of forms.

For purpose of clarification, a "goal oriented" electronic form is one in which the prompts for answers generally flow through the form from left to right; and from top to bottom of the form; and the ongoing pattern of prompting is conditioned on answers provided to the form or on data obtained from referenced sources. Advantageously, as the answers to the field prompts are entered, fields which need not be answered are skipped, and fields on the same or a linked form are prompted in the desired sequence.

In the event that an individual completing a report, by choice, revisits a completed field and enters a new value in the field, my form system automatically executes a prompting sequence consistent with that new value, and calculates new values for fields which are dependent on the value in the changed field. Advantageously, it is thus possible to try various "what-if" scenarios. This feature of my system is termed "truth maintenance" since only valid and necessary prompting is implemented; and all calculated results are consistent with the values in the completed fields of a form.

In accordance with my invention, my system provides a set of intuitive "creation" tools which readily permit creation of the above referenced form files. In an illustrative embodiment of my invention, form creation is divided into four natural selectively reentrant activities: an initial specification of the fields of a form to be created; specification of the tree branches and conclusions to implement the intended logical and mathematical relations of the form; specification of reading and writing links to selected data files; and specification of relations between forms to define a stack of related interdependent forms.

Advantageously, these activities can be performed in any desired order; and each activity can be reentered selectively to make additions and/or corrections in order to accommodate thoughts which occur in the course of form creation.

Furthermore, at any point in the process of form file creation, it is possible to selectively display: the current form; any selected part or all of the related tree structure; links to data sources and destinations; and the contents of a stack and the order of the contents in the stack.

In accordance with my invention, if during the course of creating a form, an expression assigned to a branch or conclusion references a form field which does not exist, my system automatically creates a new field which adopts the established name. Subsequently, a field may be placed on the form to hold that name; however, if no field is assigned on the form, my system automatically prompts for a value at the appropriate place during the completion of the form. The prompt for such a field presents a prompt window that requests selection of a value for the question that does not appear on the form; however, a value is required for that field since continued prompting in the form is dependent on the value selected.

In accordance with my invention, if during the course of creating a form, links are requested to a data base which does not exist, my system automatically creates a new data base with fields, which adopt the established names and characteristics of the fields contained in the form system.

In accordance with my invention, "help" information may be assigned to a field during form creation; and that help information is available to an operator during form completion.

In accordance with my invention, I provide "run time" software for operator completion, but not alteration, of previously created forms. My "run time" software permits an operator to selectively view the trees associated with a form being completed to provide an understanding of the logical and mathematical relations and processes embodied in the form. Advantageously, my graphical tree displays identify "active" and "inactive" tree branches in accordance with data gathered in the form prior to display of the tree.

Advantageously, my form system automatically reformats horizontal segments of a graphical display of a tree that covers two or more horizontal segments and two or more vertical screens in order to minimize the number of vertical screen displays required to show the entire horizontal segment.

Advantageously, my system may be used to both create and complete goal oriented forms to implement inquiries in any situation in which the relations and functions of the fields of a form can be described by a tree of branches and conclusions.

Although my forms provide goal oriented prompting, an operator may choose to depart from the suggested order of form completion. In accordance with my invention I provide a "resume" function which may be manually selected to return to goal oriented prompting for further answers required to complete a form.

During completion of a form, a field may require selection of a value from a defined set of values. The list of values, from which a selection is to be made, may be created manually during form creation; or may be derived from tree statements which: (a) are attached to the field and create answers which correspond to the selections in the list; (b) rely upon selection of a value from the list to complete evaluation of an expression; or (c) are established by a link to a database which provides values contained therein.

In the course of form creation, the display of fields which require selection of a value from a set of values, as a design choice, may be defined as "selection list" fields or "check box" fields.

In the case of a "selection list" field, a dialog window with a list of values is presented for selection of a value when the corresponding field is prompted for an answer. A selection is made by moving a cursor over the desired item and clicking the mouse or depressing the return key.

In the case of a "check box" field, each value of the list is displayed with a small box for placing a check mark. In accordance with my invention, my form system automatically generates a field object which contains a number of selection boxes equal to the number of possible selections. Advantageously, my system automatically arranges the display of the set of selection boxes to match the size and shape of the field on the form. If the allotted field space is too small to accommodate all of the check boxes and their name text, the field is automatically defaulted to a "selection list" field.

In accordance with my invention, keyboard entries are checked against "field characteristics" which are assigned to a field during form creation. If a keyboard entry for a field is not consistent with the assigned characteristic, the entered value is rejected and an error message advises the operator of a problem. Such characteristics can be assigned to a field by standard "picture" specifications. Alternatively, requirements for the form of a field input can be established by local form rules which are implemented by decision trees attached to the field. As an option, upon the occurrence of an error in input format, the field in error can be cleared and the prompt returned to that field to continue form completion.

In accordance with an aspect of my invention fields of a form may be designated as "protected" or "unprotected" at the time a form is created. Values cannot be entered manually in a "protected" field since only the values calculated for the field are considered valid. Even though a value may be automatically calculated for an "unprotected" field, a value may be entered into the field manually to handle exceptional conditions. Fields with this characteristic are termed "over ride" fields. Advantageously, in accordance with my invention, my system clearly marks or flags both the display and printing of fields which contain over ride values.

THE DRAWING

FIG. 3 is a general view of the major elements of my goal oriented for software;

FIG. 4 is a general view of a form image data file;

FIG. 9 is the first form in a set of four forms for an application for life insurance example;

FIG. 10 is the four forms for an application for life insurance example;

FIG. 11 is the third form in a set of four forms for an application for life insurance example;

FIG. 12 is the fourth form in a set of four forms for an application for life insurance example;

FIG. 13 illustrates a window with a "goal" life insurance application for completion or modification;

FIG. 14 illustrates the display of a second form for prompting of value necessary for completion of a goal form;

FIG. 16 illustrates the indication that a value for a field on a form has been overridden by a user;

FIG. 18 illustrates the automatic arrangement of check boxes in a vertical region;

FIG. 19 illustrates the automatic arrangement of check boxes in a horizontal region;

FIG. 20 illustrates the automatic presentation of a selection list when insufficient space is provided in a region for check boxes;

DETAILED DESCRIPTION

The illustrative embodiment of my invention is disclosed as an application program running under Microsoft WINDOWS™ graphical environment program on an IBM compatible PC.

Notwithstanding, disclosure of my invention in this particular environment, the principles of my invention can be implemented as a program which includes an integral interface facility; or in the context of other interface environments.

Although the graphical images and protocols employed by my form system are generally driven by the WINDOWS environment, my system includes menu features which are not present in or contemplated by WINDOWS. The general features, functions and protocol of WINDOWS are described later herein with the introduction of the opening window of FIG. 5.

Figure 1:
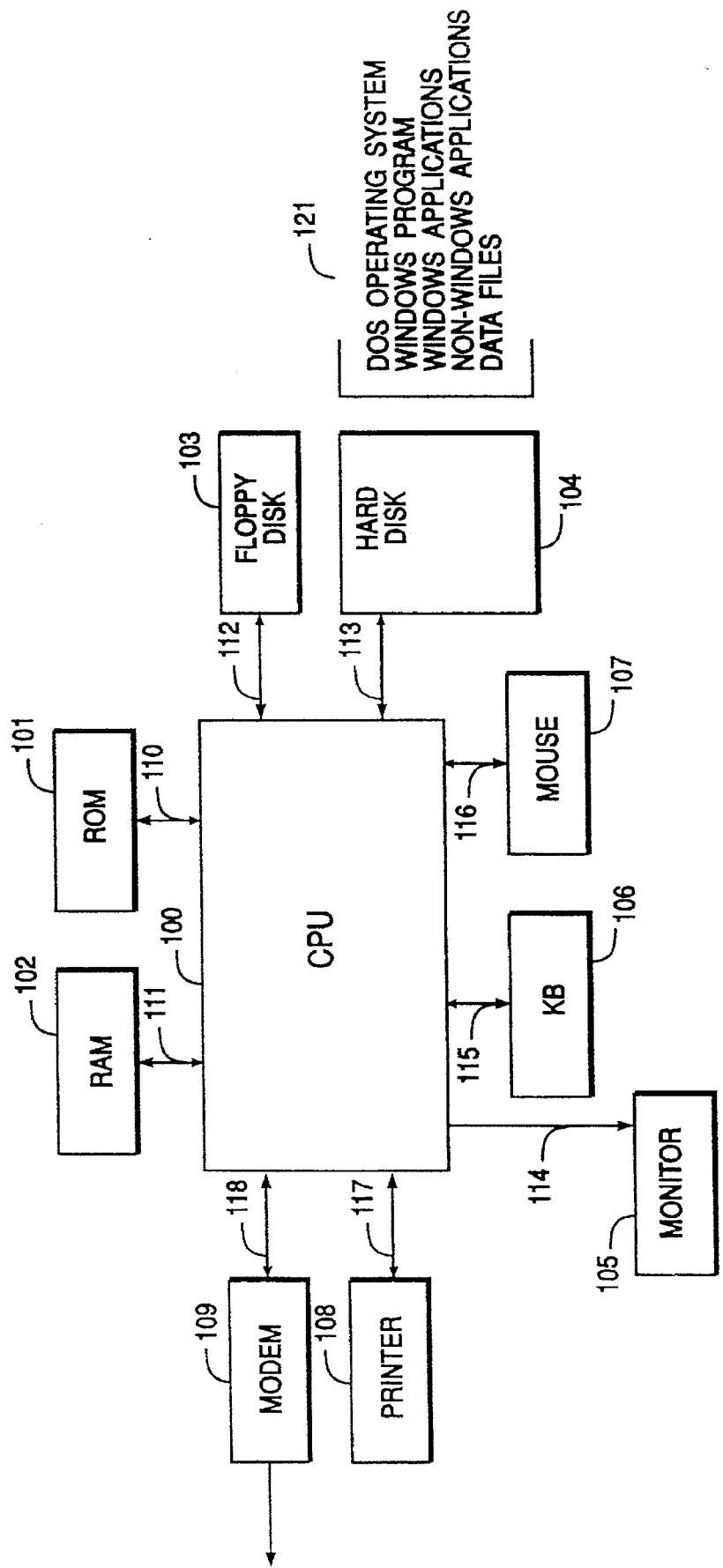
FIG. 1 is a block diagram of a personal computer

FIG. 1 is a very general block diagram of an IBM compatible personal computer (PC) which supports the Microsoft WINDOWS graphical environment, and, in turn, WINDOWS supports my form system which is described herein.

The central processing unit (CPU) 100 typically employs a processor of the Intel™ family of microprocessors. The read only memory (ROM) 101 contains the basic input output system code (BIOS) for addressing and controlling floppy disk 103, hard disk 104 and printer 108. Random access memory (RAM) 102 is the working memory for CPU 100. In a typical WINDOWS installation, RAM of two megabytes or more is employed.

Monitor 105 of FIG. 1 provides a visual display; keyboard (KB) 106 and mouse 107 provide for manual input to any process running on the PC. Printer 108 creates hard copy images of output of the PC; and modem 109 provides communication between the PC of FIG. 1 and other computers.

In FIG. 1, hard disk 104 is illustrated as containing a body of program and data information 121. Included in this body of information is a disk operating system (DOS), the WINDOWS graphical environment system software; user application programs which operate under the WINDOWS environment; user application programs which do not employ the WINDOWS environment facilities; and data files of all sorts.

Figure 2:
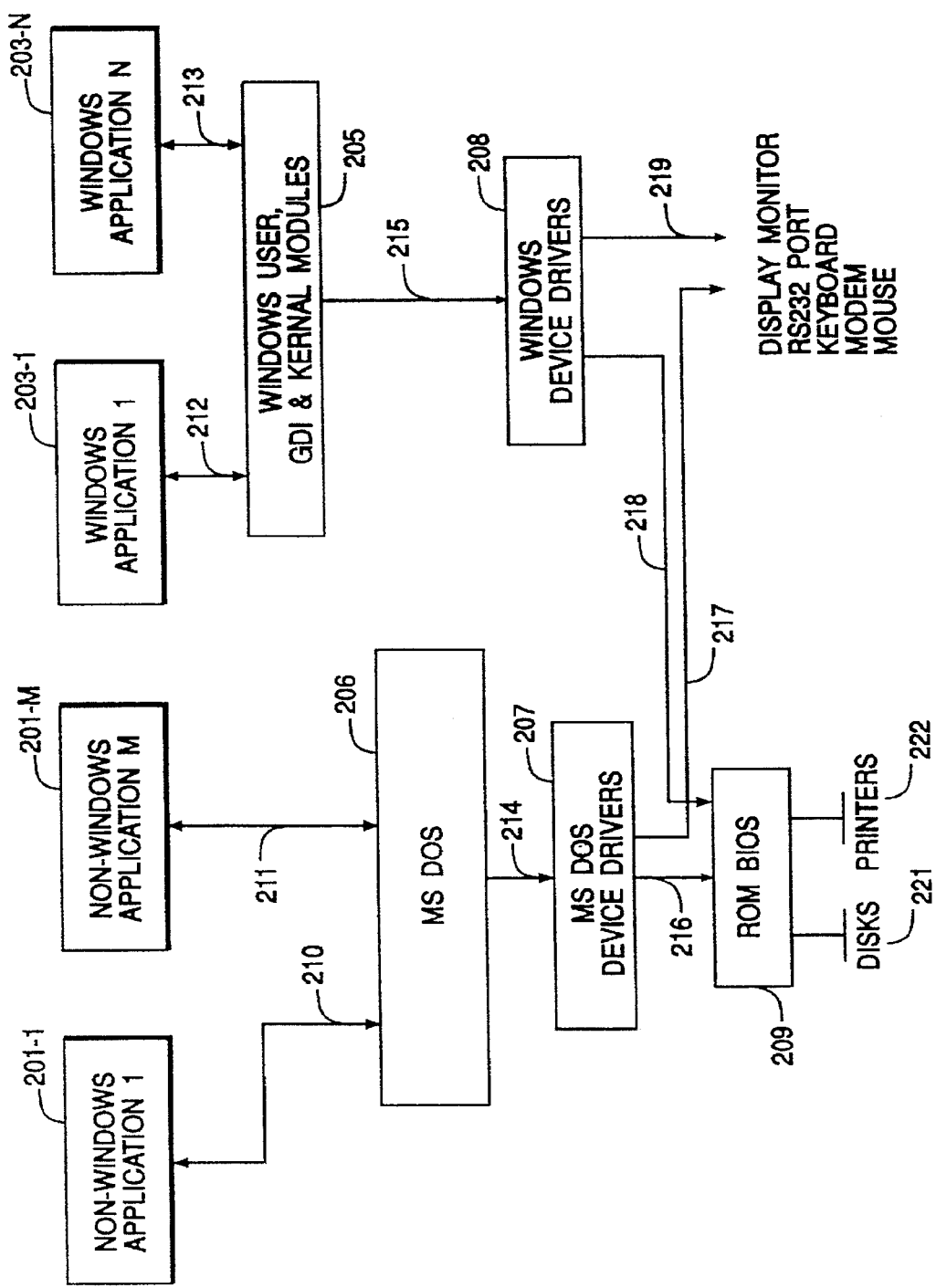
FIG. 2 is an overview of software employed in the personal computer of FIG. 1.

FIG. 2 illustrates, in a general way, the interaction and flow of information between the illustrated software entities.

Non-WINDOWS application programs 201-1 through 201-M are served by the CPU 100 operating under Microsoft Corporation MS DOS system 206. Programs and data flow between Non-WINDOWS applications 201-1 through 201-M and MS DOS 206 via paths labeled e.g., 210, 211. Paths 210, 211 are symbolic paths and are not intended to represent physical paths.

The MS DOS operating system 206 employs MS DOS software device drivers to control the disks 221 and printers 222 through the facilities of ROM BIOS 209. MS DOS device drivers also control system communication with the display monitor, an RS232 port, a keyboard, a modem and a mouse.

WINDOWS application programs 203-1 through 203-N are served by WINDOWS graphical environment software 205. The windows software comprises: User, graphical device interface (GDI) and Kernel modules. Symbolic communication paths 212 and 213 pass function calls to WINDOWS software 205 and responses to the respective WINDOWS application software.

WINDOWS device drivers 208 are the counterpart of MS DOS device drivers 207 and serve the same functions.

In FIG. 3, box 300 represents the major software modules of my form system. In accordance with my invention my form system comprises two modes of operation, namely "form creation" and "run time" form completion. Form creation comprises four phases:

(1) Definition of: a form image for all forms of an application, names of fields of the form or forms, and field characteristics;

(2) Definition of the forms of a related set i.e., a "stack" of forms and the assigned order of the forms in the set. When a form set is opened for completion, the defined order establishes which form of a set is the initial "goal" form, and the order in which the other forms of the set are presented for completion;

(3) Definition of decision tree structures comprising branches and conclusions which are assigned to the fields of the forms which comprise a related stack of forms; and (4) Definition of reading and writing links between fields of a form and extrinsic data sources and destinations.

The four tool modules, 301 through 304 serve in the implementation of phases 1 through 4 referenced above herein. Tool modules 301 through 304 are not available in my run time form completion mode of operation.

Memory manager module 305 manages the assignment of memory space. This module performs common functions for the other modules relating to the allocation and deallocation of portions of memory to contain data structures. It does this by allocating large portions of memory from Windows and dividing these into smaller portions as needed by the other modules. The memory manager also maintains a list of names used for forms, fields, system functions, and links (called a symbol table) so that the portion of memory associated with these items can be located and referenced by its name.

Form execution module 306 and tree execution module 307 serve in implementation of my goal oriented form completion mode of operation. These modules are also available for use in conjunction with tools 301 through 304 during form creation.

Link manager module 308 implements reading and writing communication with the extrinsic data sources and destinations defined during form creation.

File I-O subsystem module 309, among other functions, controls the transfer and the form of data as it is moved between the hard disk and the RAM main memory of the PC.

WINDOWS interface module 310 provides communication between my form system and the WINDOWS graphical environment software.

FIG. 4 represents the major divisions of my "form image data file" which is generated during form creation and is maintained in disk memory.

The form image data file shown in FIG. 4 represents a file format in which my graphical image data file for documents are saved on disk; its structure and operation will now be described in detail. The file is a binary file and can be considered to be a sequence of variable length chunks of data called records. Each record begins with a 2-byte ID data byte followed by 4 bytes which define the length of the remainder of the record. The last record of a file is an EOF (End-of-File) record.

Information is preferably stored as follows. Character data, numeric data, or other single-byte data are in ASCII format. Multiple-byte data, on the other hand, is stored in little-endian form, i.e., the least significant byte comes first. This is the natural byte order for little-endian machines like those based on the Intel 8088 architecture and its descendants. Implementation of the form system on big-endian machines, like those based on the Motorola 68000 and its offspring, require a byte swap on all multiple-byte data.

Environment specific information is stored in a Form Picture (FORMPICTURE) record. Because an implementation can ignore records that it does not recognize (e.g., u2PictureFormat described below), picture definitions for multiple environments can coexist, i.e., a file can contain both a Macintosh and a MS Windows version of a picture and as a result be run on either system.

Data Element Naming

In a preferred embodiment, a convention is adopted whereby the name of each data element implies its format on disk. For example, the name u2DummyData, as identified by its prefix "u2", is a 2 byte unsigned integer with the least significant byte first. If a name has no prefix (i.e., has an initial capital), it is a complex structure or sequence defined elsewhere. Other exemplary prefixes are defined in the following table:

TABLE 1

Name Prefix Definitions

| Prefix | Meaning |
| --- | --- |
| u1 | 1 byte unsigned integer |
| u2 | 2 byte little endian unsigned integer |
| u4 | 4 byte little endian unsigned integer |
| sv | variable length string (u2 length of string followed by string w/o null termination) |
| dv | variable length data (see separate definition) |
| ov | variable length object code (see separate definition) |

General Data File Format

In an exemplary embodiment, every record may be organized as follows:

TABLE 2

Record Organization

| Name | Comments |
| --- | --- |
| u2RecordType | Record type |
| u4RecordLength | Length of data portion |
| <data portion of record> | Actual data |

For simplification, the 6 header bytes (record type and length shown above) will not be repeated below when describing individual records.

Preferably, records of a graphical image data file are ordered. Some of the records may not be present (depending on the needs of the user's application), however. An exemplary order of records may be defined as follows:

TABLE 3

Order of Records

BOF
IGNORE_REMOTE
FORMNAMES
FIELDNAMES
FONTNAMES
for each form
    FORMSIZE
    for each field, text, picture, or pattern
    FORMFIELD, FORMTEXT, FORMPICTURE, or
    FORMPATTERN
for each field
    FIELDTREE
    FIELDHELP
    FIELDEXPECT
    FIELDVALUE
for each dBase link
    DBASE_LINK
for each DDE link
    DDE_LINK
for each ASCII link
    ASCII_LINK
EOF Record Definitions Each record will now be described. The Beginning-of File (BOF) record (type=1) includes an application identifier (u2ApplicationId) and a version identifier (u2Version). The BOF record is typically the first record in every graphical image data file. Following the BOF record is the Ignore Remote (IGNORE_REMOTE) record (type=2). It includes a Ignore Remote Requests (u1IgnoreRemoteRequests) flag which stores one of the following values: 1=ignore remote requests, or 0=do not ignore remote requests. When enabled, the flag causes the application to ignore remote requests for data (such as an application request through Microsoft Windows DDE).

Next, the Form Names (FORMNAMES) record (type=3) stores Number of Forms (u2NumberOfForms), which specifies a count of the number of Form Name (svFormName) which follow. A form's position in this list of names is its ID, beginning at 1, for use elsewhere in this file. In a like manner, Field Names (FIELDNAMES) record (type=4) stores stores Number of Fields (u2NumberOfFields), which specifies a count of the number of Field Name (svFieldName) which follow. Here, a field's position in this list of names is its ID, beginning at 1, for use elsewhere in this file.

Font information is maintained in the Font Names (FONTNAMES) record (type=5). The record comprises a list storing a Number of Fonts (u2NumberOfFonts); this is followed by Font Name (svFontName), Font Size (u2FontSize), and Attribute Mask (u1AttributeMask) for each font. For the latter, exemplary values include FONT_UNDERLINE (0x04), FONT-ITALIC (0x02), FONT_BOLD (0x01). A font's position in this list is its ID, beginning at 1, for use elsewhere in this file.

The size of a form is specified by the Form Size (FORMSIZE) record (type=6). It includes a Form Id (u2FormId) established in FORMNAMES, a horizontal size (u2xSize) typically in units of ¼ character width, and a vertical size (u2ySize) typically in units of ⅛ character height.

A field item on the form identified in the last FORMSIZE record is defined by a Form Field (FORMFIELD) record (type=7). It includes a Field ID (u2FieldId) which is established in FIELDNAMES; a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and finally a Property List (PropertyList) for the field item (last property is always end of page (EOP)).

A text item on the form identified in the last FORMSIZE record is defined by a Form Text (FORMTEXT) record (type=8). It stores ASCII text (svText), a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and finally a Property List (PropertyList) for the field item (last property is always EOP (end of page)).

A picture item on the form is defined by Form Picture (FORMPICTURE) record (type=9). It includes a horizontal location (u2xLoc) in units of ¼ character width; a vertical location (u2yLoc) in units of ⅛ character height; a horizontal size (u2xSize) in units of ¼ character width; and a vertical size (u2ySize) in units of ⅛ character height.

The record includes a Picture Definition (PictureDefinition) storing the picture in one or more picture formats. In this manner, each implementation may pick the first picture format it recognizes. An exemplary Picture Definition includes Picture Format (u2PictureFormat), 0x01 representing a MS Windows BitMap file; Length (u4Length), number of bytes that follow; File Name (svFileName), a file containing a picture; Picture Format (u2PictureFormat), where 0x02 represents a MS Windows Metafile; Length (u4Length), showing the number of bytes that follow, File Name (svFileName), the name of file containing the picture; Map Mode (u2MapMode); Picture Format (u2PictureFormat); Length (u4Length), number of bytes that follow; Bytes to Skip (<bytes to skip>); and again a Picture Format (u2PictureFormat), where 0x00 indicates end of picture formats. It concludes with a Property List (PropertyList) for the field item (last property is always end of page (EOP)).

A pattern item on a form is defined by a Form Pattern (FORMPATTERN) record (type=10). It includes a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and a Pattern (u1Pattern). Exemplary values for the latter include 0=horizontal lines, 1=vertical lines, 2=diagonal lines, top-left to lower-right, 3=diagonal lines, lower-left to top-right, 4=horizontal and vertical lines (cross), 5=diagonal lines in both directions (diagonal cross), 6=0% black (white), 7=6% black, 8=13% black, 9=19% black, 10 =25% black, 11=50% black, 12=75% black, and 13=100% black. The last property is always End of Page (EOP).

The decision tree for a field is defined by a Field Tree (FIELDTREE) record (type=11). The best way to describe the order of the nodes in the file is with metacode for writing them. To save a tree to disk one would just parse the top node of the tree to SaveNode() as follows:

```
function SaveNode( Node )
    if ( Node )
    {
        SaveNode( Node.FirstChild )
        SaveNode( Node.NextSibling )
        WriteNodeToFile( Node )
    }
```

In general, the FIELDTREE record stores a Field ID (u2FieldId), which associates the tree with a specific field, and a "Tree" structure. The Tree, in turn, stores one or more of a Branch Node, a Conclusion Node, a Null Node, and an End-of-Tree marker. Each of these will be further explained.

The general format of the Branch node is that of a Node Definition, Condition, and Field ID, arranged as follows:

Branch Node
u1NodeDef
ovCondition
u2FieldId

The Node Definition is an identifier indicating a Node Type (i.e., End of Tree, Branch, Conclusion, or Null) and includes bit flags for specifying whether the node has at least one sibling and whether the node has at least one child. In an exemplary embodiment, such an indentifer may be constructed from a single byte (8-bit) identifier as follows:

TABLE 4

| | | u1NodeDef identifier | |
|---|---|---|---|
| Bits | Mask | Meaning | |
| 7 | 0x80 | flag: node has a sibling | |
| 6 | 0x40 | flag: node has children | |
| 5–4 | 0x30 | Reserved (must be zero) | |
| 3–0 | 0x0F | Node type: | 0 = End of tree |
| | | | 1 = Branch |
| | | | 2 = Conclusion |
| | | | 3 = Null |

As shown, following the Node Definition is a Condition (ovCondition) and a Field ID (u2FieldId) for the node. In this manner, the Tree may include a specific condition (e.g., in byte code format) responsive to a particular field (referenced through the Field ID, which identifies a particular field established in FIELDNAMES).

In a manner similar to the layout of the Branch Node, a Conclusion node may be defined by storing a Node Definition, Condition, and Conclusion, arranged as follows:

Conclusion Node
u1NodeDef
ovCondition
ovConclusion

The Node Def. and Condition function in a manner similar to that described for the Branch node. The Conclusion node adds a Conclusion (ovConclusion) whereby a conclusion may be asserted (when the conclusion is reached). For instance, a conclusion may be asserted, upon meeting one or more appropriate prerequisites (conditions), that an item ordered by a customer should have sales tax of 6% added.

In addition to Branch and Conclusion Nodes, the FIELDTREE record may include Null and End-of-Tree nodes. The Null node may be constructed as:

Null Node
u1NodeDef
ovCondition

Thus, the node may test for a general condition, that is, it need not be associated with any particular field. The End-of-Tree node, on the other hand, simply serves to mark the end of the Tree for that FIELDTREE record. It includes just an identifier:

End-of-Tree Node
u1NodeDef

As shown above (in Table 4), the u1NodeDef identifier has its three lower bits set to 0.

Help text for a field is defined by Field Help (FIELDHELP) record (type=12). It includes field ID (u2FieldId) established in FIELDNAMES. This is followed by the specific help text (svHelpText) stored for the field. In a preferred embodiment, the text is stored in ASCII format.

The list of expected values to be used in a list-box or check-box prompt for a field is defined by Field Expect (FIELDEXPECT) record (type=18). The record first includes Field ID (u2FieldId) established in FIELDNAMES. Next the record includes a count or Number of Values (u2NumberOfValues), followed by one or more Value (dvValue) items.

A specific value for a field is maintained by a Field Value (FIELDVALUE) record (type=13). It includes Field ID (u2FieldId) established in FIELDNAMES, and Value Source (u1ValueSource), and dvValue (value). The Value Source is a selected one of 0=User (user input or override), 1=Circular (user input for circular tree), 2=Link (external link), and 3=Tree (decision tree).

As the system may link one or more fields to external data sources, records are provided for defining and maintaining links. A link to a dBASE table, for instance, is maintained by a DBASE_LINK (dbase link) record (type=19). It includes Link Name (svLinkName), a file name for the dBASE file (svDbaseName) of interest, and an index (svIndex) file name of index file for that table. The type of link desired is specified as Inexact (u1Inexact) member, where 0=Exact and 1=Inexact. The record also specifies a number of triplets (u2NumberOfTriplets) that follow. Each triplet includes a dBASE Field Name (svDbaseFieldName), a Read Field ID (u2ReadFieldId) established in FIELDNAMES, and a Write Field ID (u2WriteFieldId) established in FIELDNAME.

In a similar manner, a links to a Paradox table may be described by a Paradox Link (PDOX_LINK) record (type=20). It includes Link Name (svLinkName), Table Name (svTabName) of the Paradox table, and any index (svIndex) name for a secondary index field. Exactness or closeness for the link is specified by a Closest (u1Closest) member, where 0=Not closest and 1=Closest. Like the dBASE Link record, the record specifies a number of triplets (u2NumberOfTriplets) that follow. Each triplet includes a Table Field Name (svTableFieldName), a Read Field ID (u2ReadFieldId) established in FIELDNAMES, and a Write Field ID (u2WriteFieldId) established in FIELDNAME.

A DDE (Windows Dynamic Data Exchange) link is described by DDE link (DDE_LINK) record (type=15). It includes a Server Application (svServerApp) name and a Link Topic (svLinkTopic). This is followed by one or more Remote Item/Field ID data pairs. The number of such pairs is indicated by a Number of Imports (u2NumberOfImports), which is positioned before any of the pairs. Each data pair itself includes a Remote Item (svRemoteItem) and a Field ID (u2FieldId) established in FIELDNAMES.

An ASCII link is described by an ASCII link (ASCII_LINK) record (type=16). It includes File Name (svFileName) indicating the disk file name of the ASCII file of interest. This is followed by an Access Type (u1AccessType), which specifies one of Read (0), Write (1), and Append (2) access. This is followed by one or more Field IDs. The number of such pairs is indicated by a Number of Field Names (u2NumberOfFieldNames), which is positioned before any of the stored Field IDs.

Each file is terminated by an End-of-File record. The End-of-File (EOF) record (type=17) simply indicates the end of the disk file and is, thus, preferably positioned as the last record in the file. It has no particular data associated with it.

Property Definitions

Property definitions are stored in a fashion which resembles the above-described series of records. Specifically, the definitions are represented by property records, each of which includes an identifier specifying a particular property type. The length of data in a property record may be implied by its type, instead of being specifically declared. Since there are fewer types of property records (than the above-described general records), the property type may be specified by a single byte.

The first three property types essentially serve as flags and, thus, have no particular data stored along with them. The No Title (NOTITLE) property record (type=1), for instance, tells the system to not display a title. No Override (NOOVERRIDE) property record (type=2) instructs the system to not allow the user to override fields. The No Tree Show (NOTREESHOW) property record (type=3) prevents the system from displaying the tree to an end user.

Property records may also store data within one or more fields. A Border Mask (BORDERMASK) property record (type=4) directs the display of different borders. It includes a Border Mask field (u1BorderMask) which stores an bit mask specifying one or more of BORDER_BOTTOM (bit 3), BORDER TOP (bit 2), BORDER_RIGHT (bit 1), BORDER_LEFT (bit 0). The default is to display all borders (i.e., bits 0-3 toggles high).

Text alignment information is stored in the Alignment (ALIGNMENT) record (type=5). An Alignment (u1Alignment) field tells how to align text (e.g., left, right, centered, or justified). The default is left alignment.

The system provides several formats for specifying properties of display. The format is specified by including a property record having type equal to the desired format. For instance, a General Format is indicated by storing a FORMAT_GENERAL record (type=7); it represents a default format. In a like fashion, a Fixed Format is indicated by storing a FORMAT_FIXED record (type=8), a Business Format by storing a FORMAT_BUSINESS record (type=10), and a Currency Format by storing a FORMAT_CURRENCY record (type=11).

As a date format may be selected from many possible formats, the Format Date (FORMAT_DATE) record (type=12) indicates the desired date format by storing in a Date Format (u1DateFormat) field one of mm/dd/yy (0), mmmmm d, yyyy (1), d-mmmm-yy (2), d-mmmm (3), mmmm-yy (4), hh:mm AM/PM (5), hh:mm:ss AM/PM (6), hh:mm (7), hh:mm:ss (8), or mm/dd/yy hh:mm (9).

Other formats which may be stored as property record types include FORMAT_LISTBOX (type=13), FORMAT_CHECKBOX (type=14), FORMAT_CHECKIF (type=15), FORMAT_BUTTON (type=16), FONT (type=17), and FORMAT_SCROLLING (type=18). Each, whose meaning is fairly self-evident, functions as a flag for its namesake type. Next, FORMAT_PICTURE (type=19) includes a Picture definition string (svPictureString). Like the general records, the property records are terminated by an End-of-Properties (EOP) record (type=6) which simply indicates the end of properties; it has no data associated with it.

Variable Length Data: Text, Numeric, Logical, and Error Data

Actual data for objects, such as found in Branch and Conclusion object, is packaged as a variable-length value preceded by a data type (byte) identifier. Text and numeric values are in "sv" format. Logical and error values, on the other hand, may be represented by a single byte flag. In an exemplary embodiment, a data object may be constructed as follows:

TABLE 5

Data Types

| | Name | Comments |
|---|---|---|
| Number: | u1DataType | 0x1A = number |
| | svNumber | the number in ASCII |
| Text: | u1DataType | 0x1B = text |
| | svText | the string |
| Logical: | u1DataType | 0x1C = logical |
| | u1LogicalValue | 0 = No (false) |
| | | 1 = Yes (true) |
| Error: | u1DataType | 0x1d = error |
| | u1ErrorValue | 1 = #DIV/0! (obsolete) |
| | | 2 = #Ref! (obsolete) |
| | | 3 = #Value! (obsolete) |
| | | 4 = NA |
| | | 5 = #NAME? (obsolete) |
| | | 6 = #NUM! (obsolete) |
| | | 7 = #NULL! (obsolete) |
| | | 8 = ERR |

Object Code (Conclusions and Conditions)

Conclusions and Conditions must specify operations to be performed by the system (e.g., testing a value, computing a new value, and the like). These operations are represented by object code, which is a sequence of tokens in Reverse Polish order. Some tokens, such as OP_PLUS, are one-bytes tokens; others, such as OPERAND_NAME, have fixed-length information that follows; still others, such as OPERAND_TEXT, are followed by variable length data. The data (operand) tokens themselves are the same as data objects defined in the section Variable Length Data above.

TABLE 6

Tokens

| Name | Comments | | |
|---|---|---|---|
| u2CodeLength | number of bytes that follow | | |
| | one or more of the following (in Reverse Polish) | | |
| u1TokenType | 0X01 | = | OP_NEGATION |
| | 0x02 | = | OP_PERCENT |
| | 0X03 | = | OP_EXPONENTIATION |
| | 0x04 | = | OP_MULTIPLY |
| | 0x05 | = | OP_DIVIDE |
| | 0x06 | = | OP_PLUS |
| | 0x07 | = | OP_MINUS |
| | 0x08 | = | OP_AMPERSAND |
| | 0x09 | = | OP_EQUAL |
| | 0x0A | = | OP_LESS |
| | 0x0B | = | OP_GREATER |
| | 0x0C | = | OP_LESSEQUAL |
| | 0x0D | = | OP_GREATEREQUAL |
| | 0x0E | = | OP_NOTEQUAL |
| | 0x0F | = | OP_POSITIVE |
| | 0x14 | = | CONTROL_EQUAL |
| | 0x15 | = | CONTROL_PARENS |
| | 0x16 | = | CONTROL_END_OF_LINE |
| u1TokenType | 0x17 | = | CONTROL_FUNCTION |
| u2FunctionId | from Table 5 | | |
| u1ArgumentCount | number of arguments | | |
| u1TokenType | 0x18 | = | OPERAND_NAME |
| u2FieldId | established in FIELDNAMES | | |
| u1TokenType | 0x19 | = | OPERAND_REFERENCE |
| u2FileId | established in FIELDNAMES | | |
| dvData | 0x1A | = | OPERAND_NUMBER |
| | 0x1B | = | OPERAND_TEXT |
| | 0x1C | = | OPERAND_LOGICAL |
| | 0x1D | = | OPERAND_ERROR |
| | (see Variable Length Data) | | |

So-called "at" (@) functions, such as those popularized by electronic spreadsheets, may be attached to selected fields, as desired. Internally, they are represented by the following ID's:

TABLE 7

Function ID's

| <<ID>> | <<Func.>> | | |
|---|---|---|---|
| 0x01 | @INT | 0x30 | @REPEAT |
| 0x02 | @DATE | 0x31 | @RIGHT |
| 0x03 | @DATEVALUE | 0x2C | @ABS |
| 0x04 | @DAY | 0x2D | @MOD |
| 0x05 | @HOUR | 0x2E | @AND |
| 0x06 | @MINUTE | 0x2F | @IF |
| 0x07 | @MONTH | 0x30 | @NOT |
| 0x08 | @NOW | 0x31 | @OR |
| 0x09 | @SECOND | 0x32 | @UPPER |
| 0x0A | @TIME | 0x33 | @LOWER |
| 0x0B | @TIMEVALUE | 0x34 | @NULL |
| 0x0C | @WEEKDAY | 0x35 | @MESSAGE |
| 0x0D | @YEAR | 0x36 | @ERR |
| 0x0E | @ROUND | 0x37 | @NA |
| 0x0F | @TYPE | 0x38 | @PXOPEN |
| 0x10 | @SUM | 0x39 | @CLOSE |
| 0x11 | @MAX | 0x3A | @TOP |
| 0x12 | @MIN | 0x3B | @BOTTOM |
| 0x22 | @CHAR | 0x3C | @PREVIOUS |
| 0x23 | @CODE | 0x3D | @NEXT |
| 0x24 | @EXACT | 0x3E | @CLEAR |
| 0x25 | @FIND | 0x3F | @DELETE |
| 0x26 | @LEFT | 0x40 | UPDATE |
| 0x27 | @LENGTH | 0x41 | INSERT |
| 0x28 | @MID | 0x42 | @STORE |
| 0x29 | @REPLACE | 0x43 | @ASCIIOPEN |
| | | 0x44 | @DDEOPEN |

Employing the foregoing exemplary records and format, the following limits are imposed. Forms, Fields, Fonts, Font size, Nodes in a tree are each limited to no more than 65,535 (i.e., $2^{16}$). X position is limited to 16,383 characters, and Y position is limited to 8,191 characters. Those skilled in the art will appreciate that the limits may be extended by simply increasing the number of respective bytes allocated (e.g., from two bytes to four bytes) as needed.

File I-O Subsystem module 309 transfers a form image data file between main memory and the hard disk for storage and retrieval in the course of creation and completion of the form defined by the file. The image file stored in main memory and the corresponding image file stored in a hard disk contain the same data; however, the file in main memory is a binary representation of the image data, and the file in hard disk is an ASCII representation of the numerical and text portions of the image data. File I-O Subsystem module 309 makes the conversions during transfer of an image file.

At the time that a form image data file is transferred to main memory for editing or completion, my form system analyzes the data therein and constructs a symbol table, a set of memory structures which correspond to each record in the data file (forms, form objects, fields, tree objects, and links), and "linked lists" which represent dependencies between the various form system components. The symbol table is a list of all names used in the form and the memory location of the records of that list.

The linked list is required to determine the proper order for goal oriented prompting through the collection of forms. The linked list represents the data dependencies which are inherent in the decision tree definitions contained within the data file. These dependencies must be comprehended by the tree execution module when performing calculations or when determining the next field value to prompt for.

Three types of dependencies must be maintained for proper execution by the tree evaluation module:

(1) The use of a field as a branch condition within a decision tree. The value of the field must be determined before a branch can be selected.

(2) The use of a field within a formula that specifies the condition under which a branch should be taken. The value of the field must be determined before the condition can be evaluated.

(3) The use of a field within a formula that specifies the conclusion value at a terminal branch of a decision tree. The value of the field must be determined before the conclusion can be evaluated.

All three types of dependencies are constantly maintained in memory using linked lists and are updated as required when additions or modifications are made to decision trees via the tree tool module.

FIGS. 5 through 8 illustrate various window presentations and pull down menu commands which may be encountered in the use of my form system.

Figure 5:
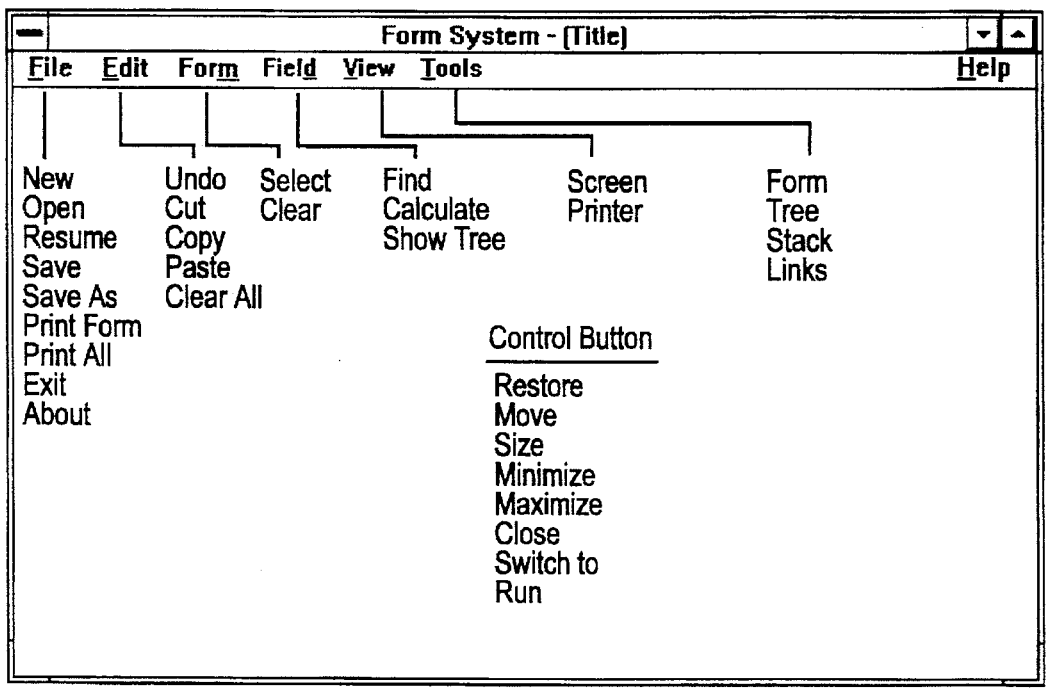
FIG. 5 illustrates an opening window of my form system application program and the menu commands available.

FIG. 5 is an opening window which is displayed prior to selection of a form application. The menu items shown in the main body of FIG. 5 are displayed on a mutually exclusive basis when the corresponding menu items, File, Edit, etc. are selected. Since this is the first window described herein, the features which are derived directly from the Microsoft WINDOWS environment are provided as background to the later description of my form system.

In the terms of WINDOWS, software, such as my form system software, is called an application program. The term application as used in WINDOWS must be distinguished from forms by which an individual makes an "application" e.g., for credit approval. With the WINDOWS definition of the term "application" in mind, the WINDOWS environment provides for two general types of windows, namely, "application" windows which contain currently running application software and "document" windows which appear with application software that can display two or more windows simultaneously.

Document windows share the application window's menu bar. Commands that affect an application window affect the document as well. Document windows have their own title bar unless their physical size is maximized to fill the screen. In the latter case the document window and the application window share a title bar.

FIG. 5 illustrates the opening window of my form system application program. The small rectangle in the upper left corner of the window of FIG. 5 represents the window control menu box which is found on all windows of the WINDOWS environment. The pull down menu for the control menu box of FIG. 5 is shown under that heading in the working area of the window. The menu for the control menu box and the main menu items are shown for purposes of discussion only. These menus are displayed only after a main menu command has been selected.

The control menu commands permit an individual to: size, move, maximize, minimize and close windows; and to switch to WINDOWS Task List from a keyboard or by use of a mouse.

The horizontal area to the right of the control menu box in FIG. 5 is the title bar which designates an application program e.g., Form System as shown in FIG. 5; and the title of the current active files under the named application program. The down and up arrows on the right side of the title bar are employed respectively to decrease and increase the size of the window.

The pull down menu commands for the opening window, as described below herein, are tailored to my form system. When a pull down menu is displayed, the commands which are then available for execution are presented in a bold black type style; and the commands which are not available for execution are displayed in a readable, but somewhat obscured print style.

Referring again to FIG. 5, and additionally to FIGS. 6–8, an exemplary menu system will now be described. The menu system includes a plurality of main menu commands, each having additional choices or (submenu) commands. Each main menu command will be described in turn.

The File menu includes New, Open, Resume, Save, Save As, Print Form, Print All, Exit and About commands. New closes any open application and prepares for a new application. Open loads an application into memory from a list of applications currently on the disk. Resume resumes goal oriented prompting in the goal form after an interruption. Save copies or saves the work to the file of the current name to the system storage (disk). Save As saves the work under a new named file. Print Form prints the current form and contents. Print All prints all of the forms of a stack. Exit closes any application and returns the user to WINDOWS. About displays information about the form system.

The Edit menu includes Undo, Cut, Copy, Paste, and Clear All commands. Undo undoes the last change. Cut cuts (copy with erase of source) a designated entity and saves it on the clipboard for subsequent use. Copy copies (without erase of source) a designated entity to a clipboard for subsequent use by the paste command. Paste pastes an entity from a clipboard to a designated location. Clear All clears data from all forms of a stack.

The Form menu includes Select and Clear commands. Select displays a list of forms for selection. Upon selection by a user, a form is loaded into the system. Clear clears data from the current form only.

The Field menu includes Find, Calculate, and Show Tree commands. Find prompts the user for name of a field to find. Calculate requests calculation of a field. Show tree displays the tree for the field.

The View menu includes Screen and Printer commands. Screen presents a display view in screen format. Printer presents a display view in the printer format.

The Tools menu includes Form, Tree, Stack and Link commands for invoking the respective tools. Form selects the Form tool and loads the Form Tool Operations as the main menu, as shown in FIG. 6. Tree selects the Tree tool and loads the Tree Tool Operations as the main menu as shown in FIG. 7. Stack selects the Stack tool and loads the Stack Tool Operations as the main menu as shown in FIG. 8. Link selects the Link tool, which employs dialogue windows to create and/or edit links.

Figure 6:
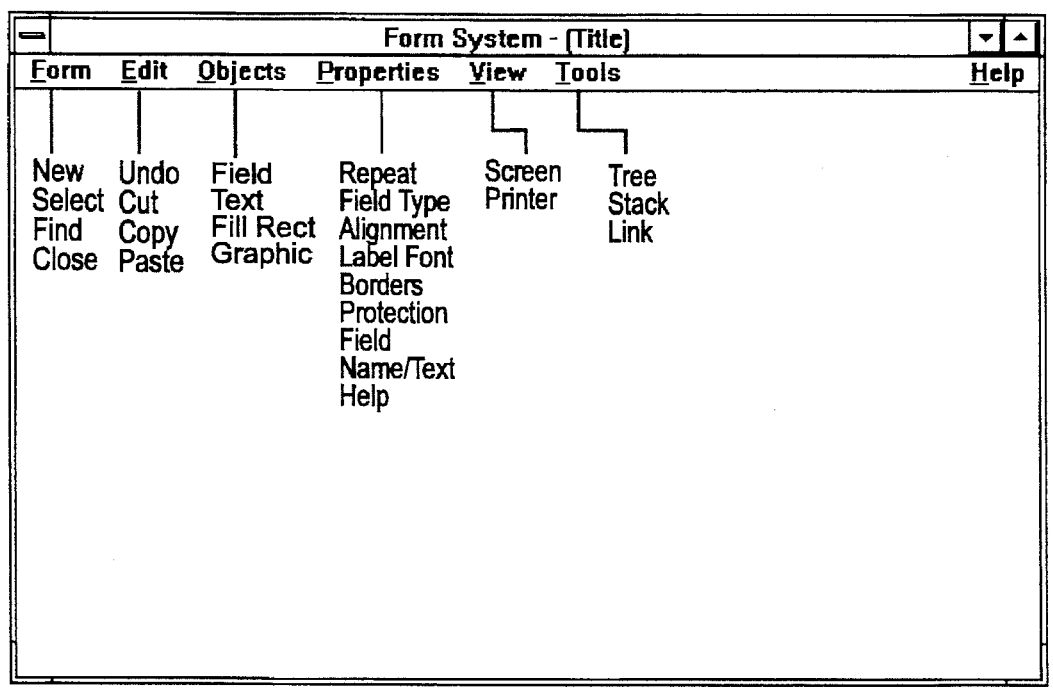
FIG. 6 illustrates a Form Tool window and the menu commands available.

As shown in FIG. 6, the Form Tool window includes operations of Form, Edit, Objects, Properties, Alignment, Font, Borders, Fill Pattern, Line Width, Protection, Field, Name/Text, Help, View, and Tools. The submenu commands of each will be described next.

The Form menu includes New, Select, Find, and Close Tool commands. New closes any open form any prepares for a new form. Select chooses or selects a form from list of available forms. Find locates or finds a form with a defined field name. Finally, Close Tool closes the form tool and returns to completion mode.

The Edit menu includes Undo, Cut, Copy and Paste commands. Undo undoes the last change. Cut cuts a designated entity and saves it on the clipboard for subsequent use by paste command. Copy copies a designated entity to a clipboard for subsequent use by the paste command. Paste pastes an entity from a clipboard to a designated location.

The Objects menu includes Field, Text, Fill Rectangle, Rounded Rectangle, Line and Graphic commands. Field creates a field object, places the field on the form, and sets the size of the field. Text creates a text object, places the object on the form, and sets the size of the object. Fill Rectangle creates a filled rectangle object, places the object on the form, selects a hatch pattern, and sets the size of the object. Rounded Rectangle creates a rounded rectangle object, places the object on the form, selects a hatch pattern, and sets the size of the object. Line creates a line object and places the line on the form. Graphic creates a graphic object, places the object on the form, specifies the graphic image, and sets the size of the object.

The Properties menu includes Repeat and Field Type commands. Field type, in turn, further includes General, Fixed, Percent, Financial, Currency, Date/Time, Scrolling, True/False, Button, Picture, Selection List, and Check Box selections. Repeat repeats the last selected property. Field Type presents the user the following choices: General, text and numerical; Fixed, numerical with set decimal places; Percent, numerical only with % display; Financial, numerical with comma separators; Currency, numerical with currency symbols; Date/Time, displays date and time (serial number of date and time since Jan. 1, 1900); Scrolling scrolls through field; True/False, for field values Yes or No (the field is displayed with YES and NO check boxes); Button, for fields which default to NO but can be momentarily set to YES; Picture, defines permitted format of entry; Selection List, for fields with one of several values from a list which is not displayed in the field; and Check Box, for fields with one of several values which are displayed as check boxes in the field (if the field display size is too small to accommodate the boxes, a selection list is displayed when the field is prompted).

The Alignment menu includes Left, Right, Center and Justified commands. Left alignment is the default for newly created fields; field values and text objects are displayed at the left edge of the object's display area. Right alignment causes field values and text objects to be displayed at the right edge of the object's display area. Center is chosen to display field values and text objects centered in the object's display area. Justified aligns multi-line field values and text objects flush against the object's left and right margins.

The Borders menu consists of Outline, Left, Right, Top and Bottom. Outline is the default for newly created fields and places lines on all sides of field; Left places a vertical line at the left edge of an object; Right places a vertical line at the right edge of an object; Top places a horizontal line at the top edge of an object; and Bottom places a horizontal line at the bottom edge of object.

Other selections include the following. In the Font menu, the user may select a font type and font size from a list. The Fill Pattern option selects a different fill pattern for a selected filled rectangle or a rounded rectangle. The Line Width option selects a different line width for object borders or for lines. The Protection menu consists of No override, and No tree display. No override means the user cannot enter value in a calculated field; and No tree display means the Tree is not displayed. The Field menu replaces the selected field object with a new field object. The Name/Text menu edits the field name. The Help menu attaches Help to selected field. The View menu consists of Screen and Printer. Screen displays screen view; and Printer displays forms as they will appear when printed. The Tools menu lists Tree, Stack, and Link, whereby the user may readily switch to the desired tool.

Figure 7:
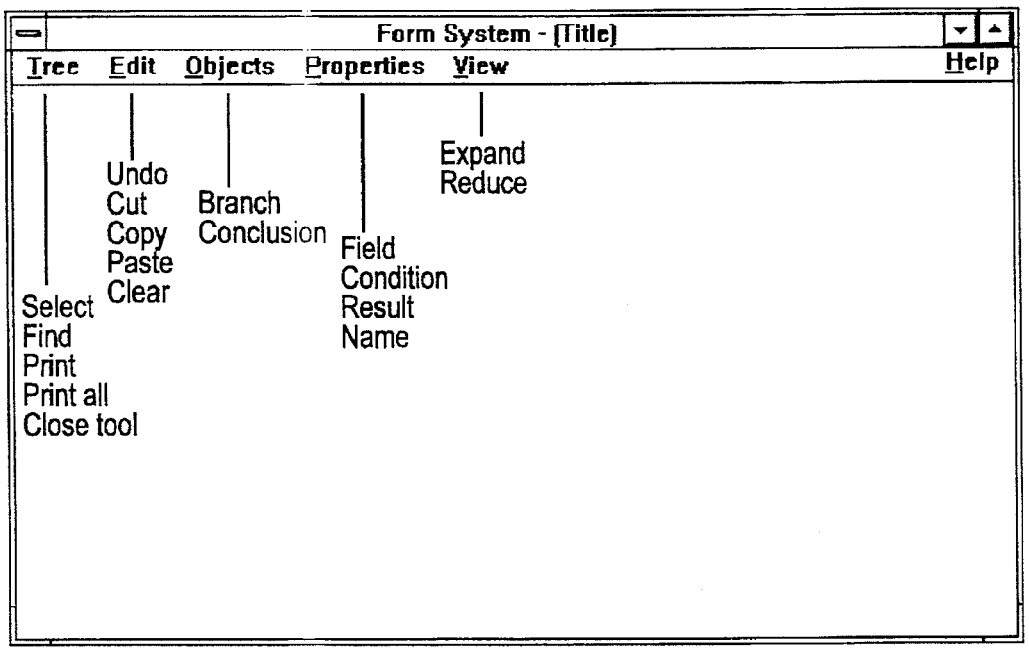
FIG. 7 illustrates a Tree Tool window and the menu commands available.

As shown in FIG. 7, the Tree Tool main menu includes Tree, Edit, Objects, Properties, and View commands. Each invokes additional subcommands, which will now be described in further detail.

Tree includes Select, Find, Print, Print all, and Close commands. Select chooses or selects a tree from a list of trees. Find locates or finds a tree containing an identified field in a branch, condition, or conclusion. Print prints the current tree. Print all prints all trees. Close tool closes the Tree tool.

Edit includes Undo, Cut, Copy and Paste commands. Undo undoes the last change. Cut cuts a designated entity and saves on clipboard for subsequent use by paste command. Copy copies a designated entity to a clipboard for subsequent use by the paste command. Paste pastes an entity from a clipboard to a designated location.

Objects includes Branch and Conclusion commands. Branch inserts a branch object at the same level as the highlighted object (in parallel). Conclusion inserts a conclusion at the same level as the highlighted object.

Properties includes Field, Condition, Conclusion and Name commands. Field instructs the system to employ a new field or another existing field to replace the field in the current branch object. Condition changes the condition for the current object selected. Conclusion allows the user to edit the expression of a conclusion object. Name allows the user to edit name for branch object.

Finally, View includes Expand and Reduce commands. Expand expands the displayed view to maximum size. Reduce, on the other hand, reduces the displayed view. This give the user flexible control over how the interface is displayed.

Figure 8:
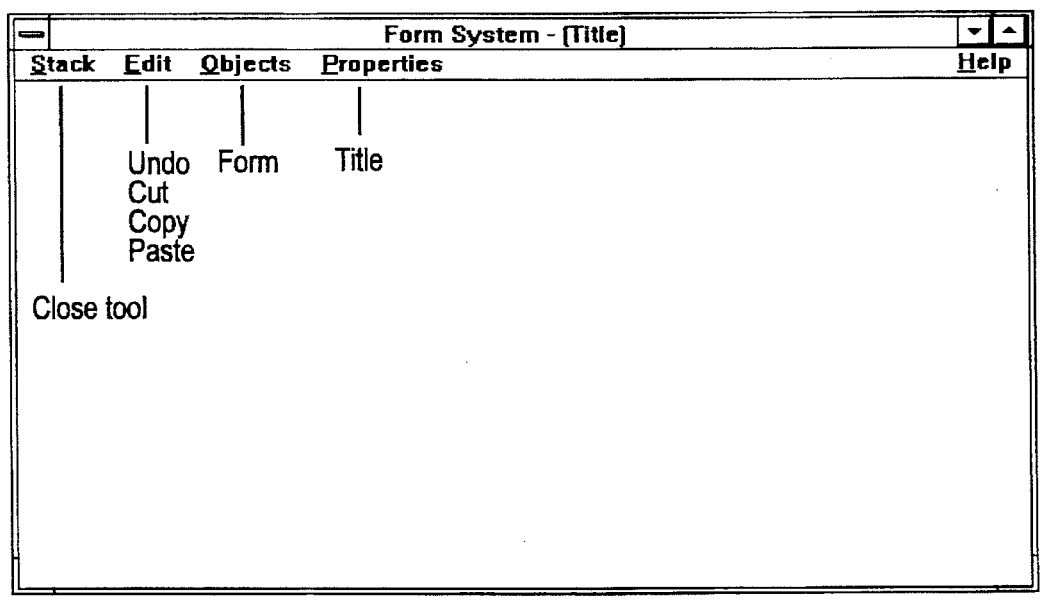
FIG. 8 illustrates a Stack Tool window and the menu commands available.

As shown in FIG. 8, the Stack Tool window includes Stack, Edit, Objects and Properties commands, each having additional subcommands. Stack menu includes a Close command, for closing the stack tool. The Edit includes Undo, Cut, Copy, Paste and Clear All commands. Undo undoes the last change; Cut cuts a designated entity and saves on clipboard for subsequent use by paste comment; Copy copies a designated entity to a clipboard for subsequent use by the paste command; Paste pastes an entity from a clipboard to a designated location in the stack; and Clear All clears data from all forms of a stack. Objects includes Form, which adds a new form to the stack. Finally, Properties includes Title, which edits the title of the highlighted form.

Modes of operation

As indicated earlier herein, my form system has two modes of operation, namely, form creation and run time form completion. In the following discussion, a description of form creation follows a description of run time form completion. This order of presentation is adopted because the description of a previously created form provides valuable insights into my goal oriented forms, and to the decision trees, links and form stack relations embodied therein.

Form Completion

For purposes of illustration, a set of four forms for making application for life insurance are displayed in FIGS. 9 through 12. The data file containing the life insurance forms is entitled Life.DF.

When form completion proceeds during a "run time" session of my form system, a subset of menu commands are available to the user. For example, none of the Tools (Forms, Tree, Stack and Link) are available.

In FIG. 5, an operator selects the "Open" command from the "File" menu. In response to this command, my form system provides a list of form files, including Life.DF, which are available for selection. A selection is made by highlighting the file to be selected and either clicking the mouse or striking the RETURN (or ENTER) key on the keyboard.

Figure 13:
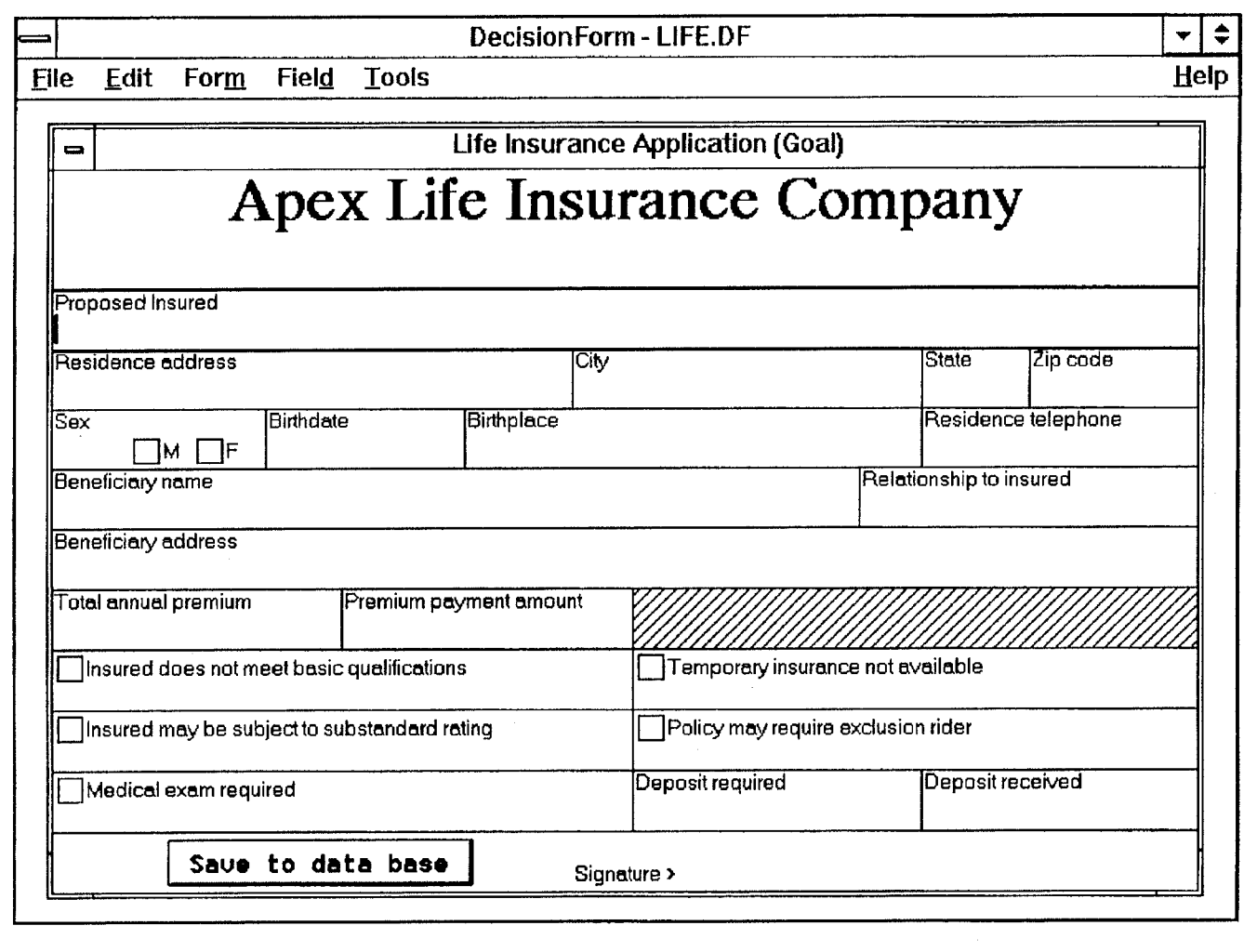

Following selection of a form file e.g., Life. DF a screen essentially as shown in FIG. 13 is presented to an operator for completion. The form shown in the window of FIG. 13 is also shown in FIG. 9.

When a goal form e.g., the Life Insurance Application form is presented as shown in FIG. 13, the first field to be completed, Proposed Insured is outlined in a heavy line and a large "T" shaped cursor is presented in that field. Information input to a prompted field may comprise: typed information followed by depression of the RETURN key of the keyboard; or may comprise selection by use of a mouse or by use of the ARROW and RETURN keys of the keyboard.

In order to implement goal oriented prompting, my system first determines which form is the goal form. When an application is initially loaded into memory, the top form of the stack is selected as the goal form. Later, an operator can use the "Select" command on the "Form" menu to select another form to become the goal form.

Once a goal form has been selected, my form system selects the first field without a value on that form as the goal field. It does this by searching down the linked list of field objects on the form until it finds a field that does not currently have a value.

Once a goal field has been selected, my system next determines which field, if any, is dependent on the goal field. This is done by looking at any decision trees which are associated with the field to determine which field in the decision tree is next needed to complete the tree. This is done by starting at the base of the tree and following all selected branches of the tree until my system detects either a branch node that does not have a value, a condition expression that does not have a value, or a conclusion expression that does not have a value. This field, if any, becomes the dependent field which my form system must prompt for next.

Once my system has determined which field to prompt for, the system next locates any form that contains this field. Starting at the top of the stack, my form system looks at each form in turn to find which form closest to the top of the stack contains that field. My form system then moves that form to the top of the stack so that the user can enter a value. If the field is not found on any form, my system prompts for the field on a special "scratchpad" form.

Once the form containing the dependent field has been moved to the top of the stack, my system then positions the cursor on the dependent field and prompts the operator to enter a value for that field.

Figure 14:
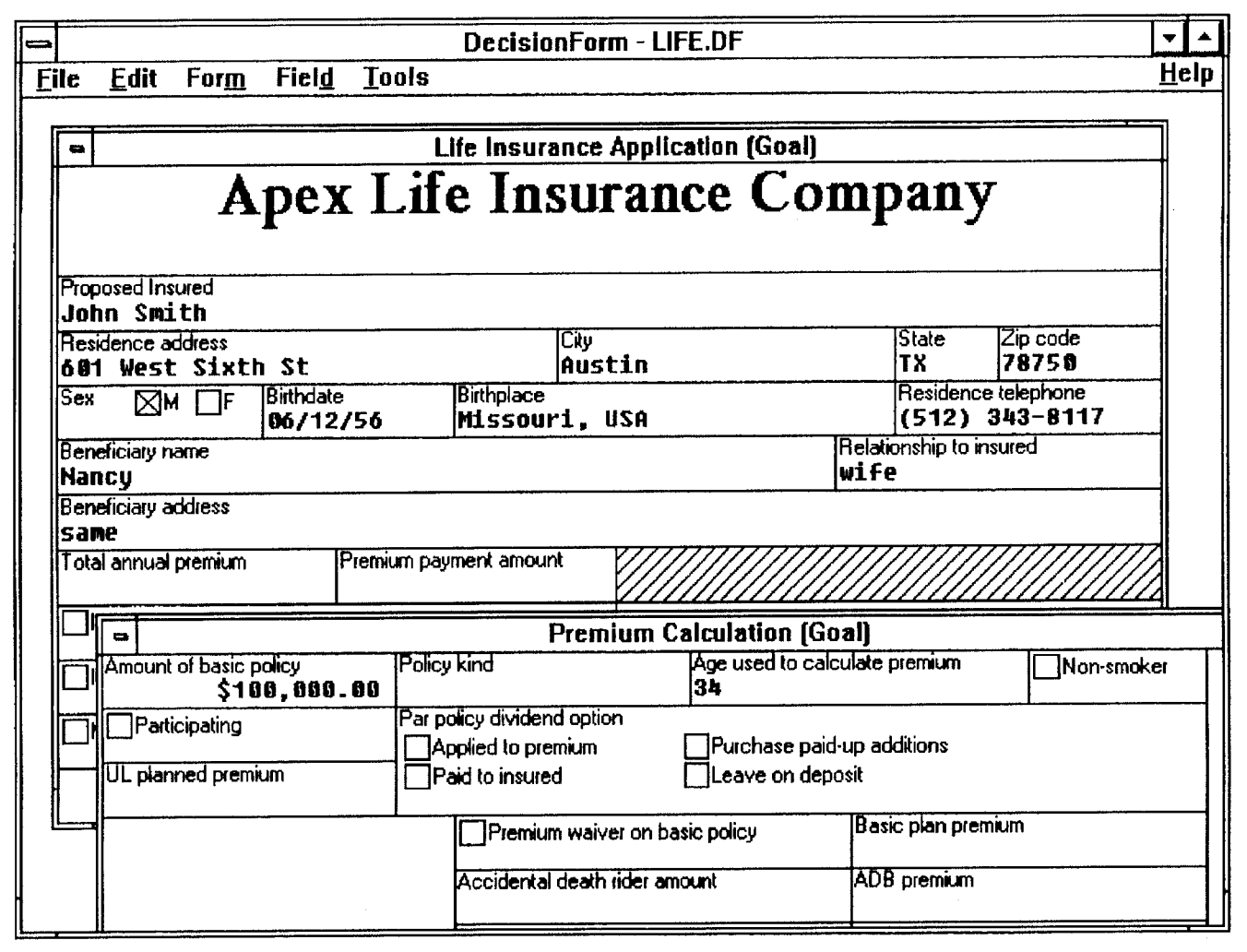

In the Life Insurance Application example shown in FIGS. 9 through 12, my system automatically prompts for fields contained on the Premium Calculation, Declarations, and Medical Information forms, as necessary, to complete the Life Insurance application form. FIG. 14 shows the display after the Premium Calculation form has been automatically moved to the top of the stack to prompt for "Amount of basic policy". This was done because my system determined that "Amount of basic policy" was the next dependent field necessary to calculate a value for the "Total Annual Premium" field on the Life Insurance Application form, which was the goal form. Since the Premium Calculation form was moved to the top of the stack temporarily due to my goal oriented prompting, it is identified as as prompt form by displaying the word "prompt" after the title of the form as shown in FIG. 14. This form will also be automatically removed from the display once the operator enters values for the dependent fields on it.

Rather than provide values for dependent fields, an operator can use the "Close" command on a prompt form's control menu to close the form at any time. When the operator does this, my system moves to the next field on the current goal form and proceeds with the goal oriented prompting for its dependent fields, if any.

An operator can also cause my system to pursue goal oriented prompting for any field of his or her choice by first selecting the field, then using the "Calculate" command on the "Field" menu. This causes my system to make the selected field the goal field for purposes of goal oriented prompting.

After a user has entered a value for a field, whether or not a prompted fild, my system must propagate that value throughout any forms and decision trees associated with that field. I call this feature of my system "truth maintenance" because it maintains at all times the logical and/or mathematical relationships between fields on forms. The actual implementation of truth maintenance is based on the linked list structures that are created as a form image data file is transferred to main memory. The first step of this process is to remove the previous value, if any, of the field before the user typed a new entry. Once the previous value has been removed from the field, this change is propagated to any fields which are dependent upon that field to remove all prior dependent values. The second step is to place the newly entered value into the field; and to propagate the changes to all dependent fields.

My system then looks and determines which forms, if any, contain the field and displays the new value on each of those forms. If the goal form, which the system selected in its goal oriented prompting, now has a value for the field which was originally the goal field, or if the operator did not enter a value for the prompted field but rather answered a value for a different field, or if the operator pressed the Tab Key, then the goal form is advanced to the next field and the goal oriented prompting sequence starts over again for that field.

My form system also maintains any dependencies related to external sources of data that have been linked to the forms. When the value of a field that is used as an index for a database is modified, my system automatically locates the appropriate record and updates the values of any fields linked to the database. Similarly, when the value of a field that is exported to another application is modified, my system automatically notifies the other application of the change.

In the Life Insurance Application example shown in FIG. 13, when the operator enters the applicant's name, my system automatically looks in a database file for information about the applicant. If information about the applicant is found in the database file, the applicant's address, date of birth, etc. is retrieved from the file and the system automatically skips over these fields. If no information about the applicant is found in the database file, the system prompts the operator for this information.

Upon entry of a value for any field, my system automatically prompts for entry into the next field according to the goal sequence defined above. As values are entered into the prompted fields, automatic prompting may continue on the initial goal form to completion of that form; or dependent on the values entered in certain fields, prompting may digress to a subsidiary form of the stack. In any event, form fields which receive their data from linked data sources or by calculation are not visited by the prompting cursor.

If the cursor is manually moved to a field which receives data from a linked source or by calculation, the outline of the field is a distinctive dotted border to advise that the operator is not expected to provide an answer. In the illustrative Life Insurance Application form of FIG. 13, the fields: "Proposed insured", "Beneficiary name", "Beneficiary address", etc. are all fields for which the operator is prompted for an answer. On the other hand, the fields: "Total Annual premium", "Premium payment amount"; and "Deposit required" are fields which receive their values by calculations.

Figure 15:
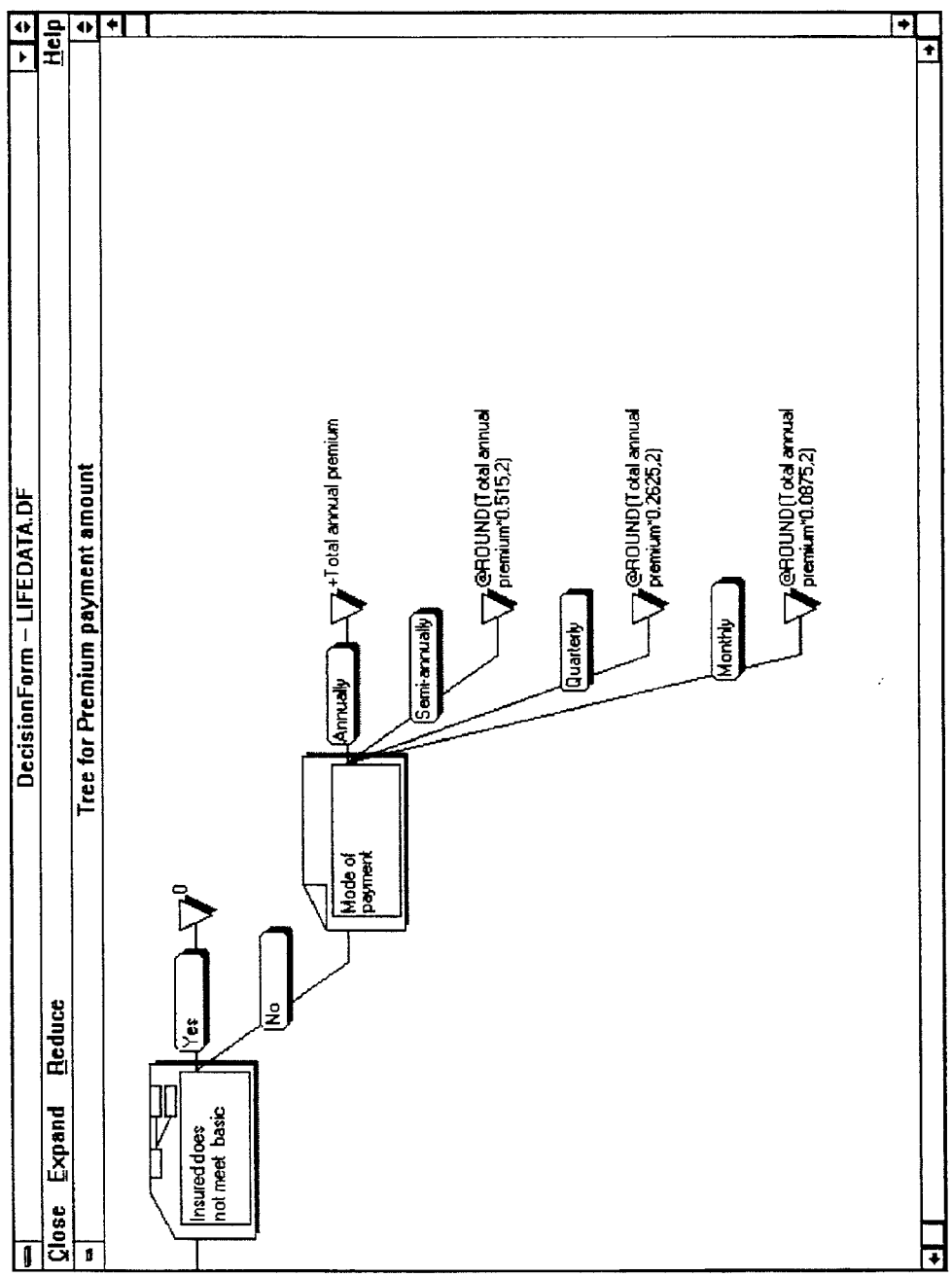
FIG. 15 illustrates the highlighting of the selected path in a tree.

FIG. 15 illustrates the ability of the system of my invention to highlight the selected path in a tree for the user. In this case, the tree for "premium payment amount" is currently determined by the value first for the insured not meeting the basic requirements being "no" and the mode of payment being "monthly" with a thicker line for that selected path and then the calculation corresponding to monthly mode of payment is the expression which is used to calculate the premium payment amount.

Also of note in FIG. 15 is the use of different icons in the decision tree display to distinguish calculated fields. The leftmost branch object includes a decision tree icon above the branch field; in this case "Insured does not meet basic". This decision tree icon indicates that the value of "Insured does not meet basic" is calculated via a decision tree rather than being entered by the operator. The other branch object, for "Mode of payment", does not have this icon. "Mode of payment" is a field which the operator must enter. This display technique highlights the capability of my invention to embed arbitrarily complex computations which result in a value for a field within a single branch object.

Figure 16:
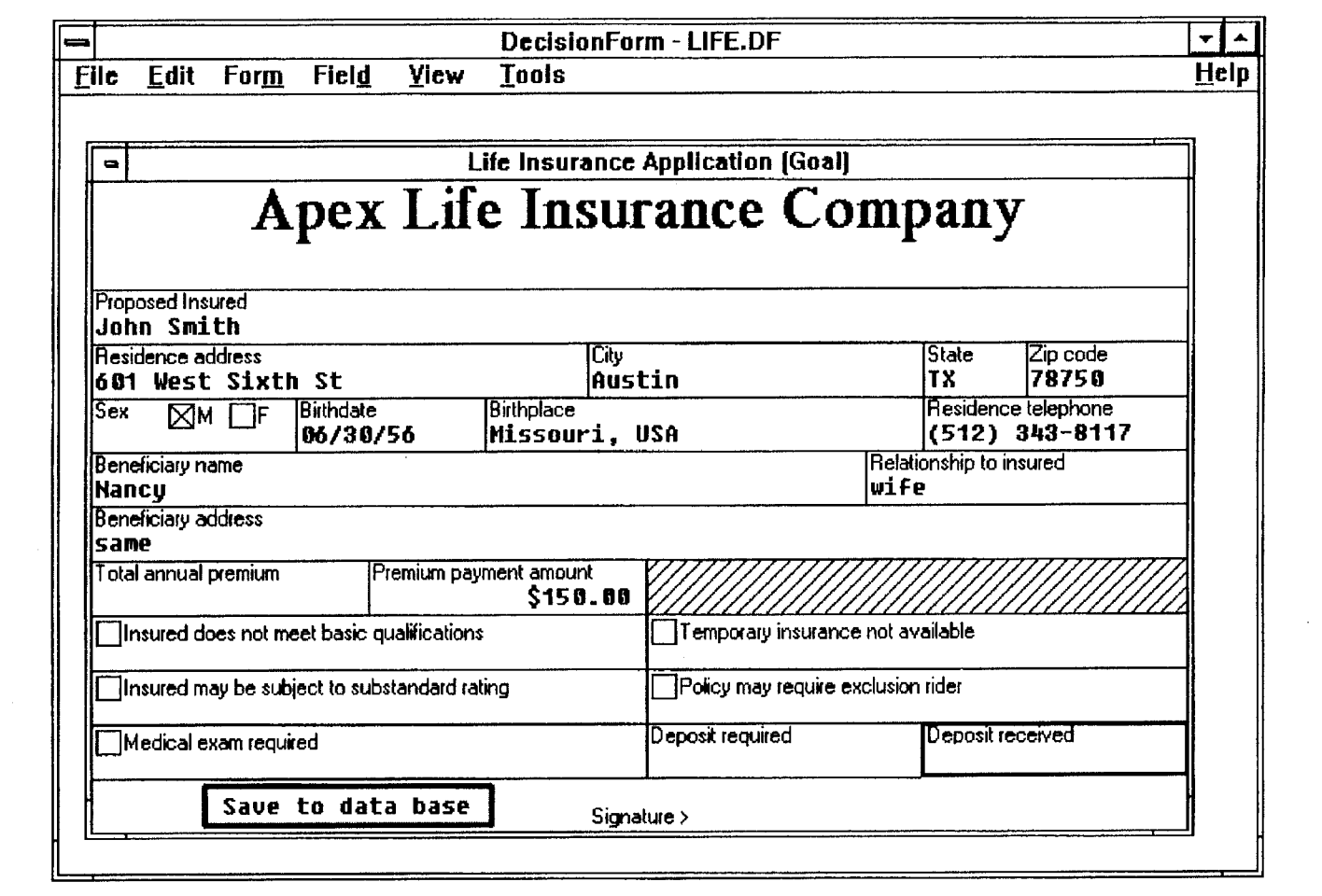

Finally, in FIG. 16 is the capability of my invention to indicate that a value for a field has been entered by the user overriding the value that would be brought to that field from the tree. In this example, the field called "Premium Payment Amount" has been entered as $150.00 by the operator and the cross/hatching over that field indicates that this value was entered by the operator rather than by the tree that is available for that correct determination of the premium payment amount.

Form Creation

I contemplate that my form system will be widely used to create sets of forms for all types of commercial, industrial and other applications of my form system almost without limitation.

Form creation in my invention involves the use of four interrelated tools. The form tool, the stack tool, the tree tool, and the link tool. These will be discussed individually in the following paragraphs.

Form Tool

The form tool of my system is a facility for creating and modifying application forms. The form tool provides a high level, graphical method for defining forms. It operates much like a drawing package and displays forms as they are being defined.

I view a form as a physical area which can be divided into a plurality of regions. The physical size of a region can be selectively set; and a region can have a border on any or all sides. The width of a region must be an integral multiple of the pitch of the default font employed in a form; and the height of a region must be an integral multiple of the height of the default font. The borders for adjacent regions are shared.

Form objects fall into two general classes, namely, static and dynamic. Regions which are assigned static form objects are not involved in my goal oriented prompting. The static form objects are: text, graphics, filled rectangles, rounded rectangles and lines. There is a single dynamic form object field. Each Field must have a name for identification and reference in trees, conclusions, and links.

There are three static form object regions in the illustrative insurance application of FIG. 13. The large title region with the text "Apex Life Insurance Company" and the signature region at the bottom of the form of FIG. 13 are both text form objects. The title region illustrates the use of text font type and size which are different from the default text. The region to the right of the region named "Premium payment amount" is a filled rectangle form object.

The remaining regions of the form of FIG. 13 are field form objects which are for ease of reference termed "fields" herein. Fields are employed to display: (a) data entered by a user; (b) data calculated by my form system; or (c) data provided by a link to an external source.

All form objects have assigned "properties" which define: size, appearance, and functions attributable to an object. For example, all form objects may be assigned a border property; and this is the only property which can be assigned to filled rectangle or graphics objects. Font and alignment properties, also, can be assigned to text objects.

In contrast to the limited number of properties available for assignment to the "static" form objects, a wide range of properties can be assigned to "fields". The properties which are available for assignment to field are enumerated in FIG. 5 under the menu heading "property". Properties available for objects was introduced above (during discussion of the preferred file format). These properties may be matched to various objects as follows:

Properties Matched to Item Type

| Property | Field | Text | Picture | Pattern |
|---|---|---|---|---|
| NOTITLE | X | . | . | . |
| NOOVERRIDE | x | . | . | . |
| NOTREESHOW | X | . | . | . |
| BORDERMASK | X | X | X | X |
| ALIGNMENT | X | X | . | . |
| FORMAT_GENERAL | X | . | . | . |
| FORMAT_FIXED | X | . | . | . |
| FORMAT_PERCENT | X | . | . | . |
| FORMAT_BUSINESS | X | . | . | . |
| FORMAT_CURRENCY | X | . | . | . |
| FORMAT_DATE | X | . | . | . |
| FORMAT_LISTBOX | X | . | . | . |
| FORMAT_CHECKBOX | X | . | . | . |
| FORMAT_CHECKIF | x | . | . | . |
| FORMAT_BUTTON | X | . | . | . |
| FORMAT_SCROLLING | x | . | . | . |
| FORMAT_PICTURE | X | . | . | . |
| FONT | X | X | . | . |
| EOP | X | X | X | X |

X = Has meaning
. = Has no meaning (and is ignored)

Upon entry of the foregoing amendments to the specification, please cancel Appendices A and B.

Once a general plan for the forms of an application has been conceived, form creation begins with use of the Form Tool of my system. The operator invokes the Form tool by using the "Form" command on the "Tools" menu shown in FIG. 5.

The form tool provides the following capabilities: (a) creation of a new form; (b) adding new objects to a form; (c) renaming, sizing and scrolling forms; (d) finding forms that contain a specified field; (e) selecting, moving and sizing form objects; (f) editing form objects with the clipboard; (g)

changing the field referenced by a field object; (h) changing the names of field and text objects; (i) adding help text to be displayed for a field object; (j) changing the display format of a field object; (k) changing the alignment of text within field objects and text objects; (l) changing the character fonts of text objects and field objects; (m) controlling which, if any, borders are drawn around objects; (n) controlling whether the field name is displayed in a field object; and (o) protecting field objects both from override by the operator or display of the tree associated with the field object.

Figure 17:
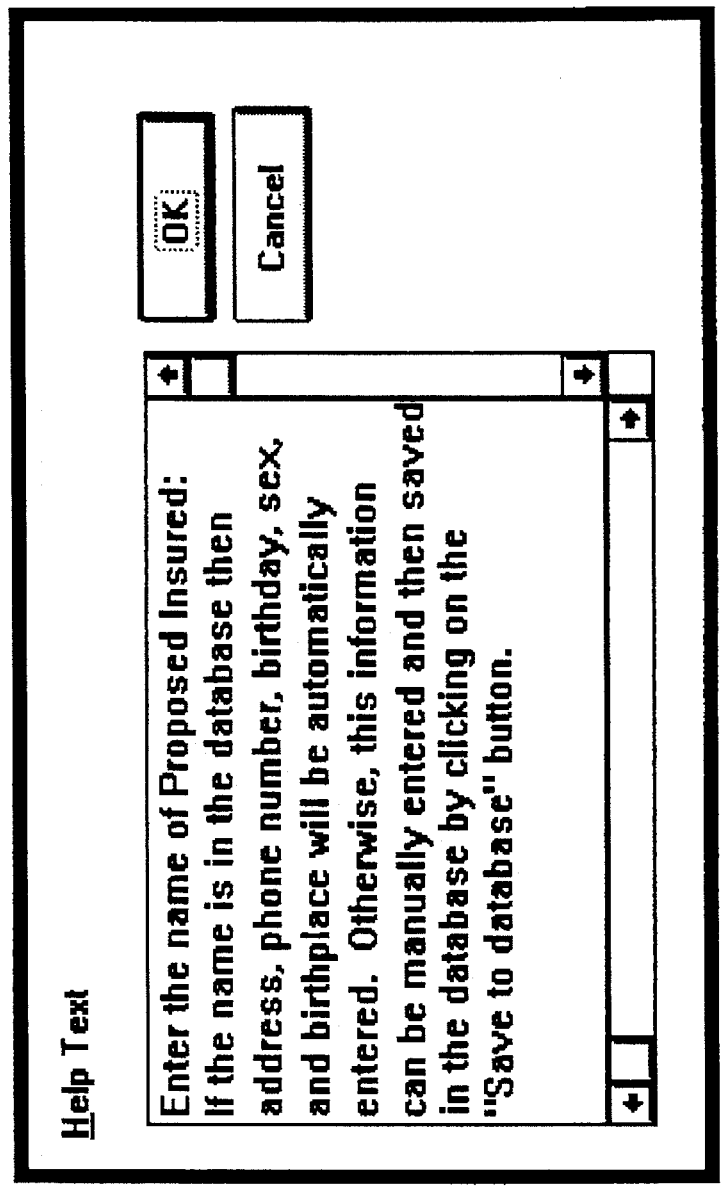
FIG. 17 is the dialog box for attaching context sensitive help to a field.
Figure 15:
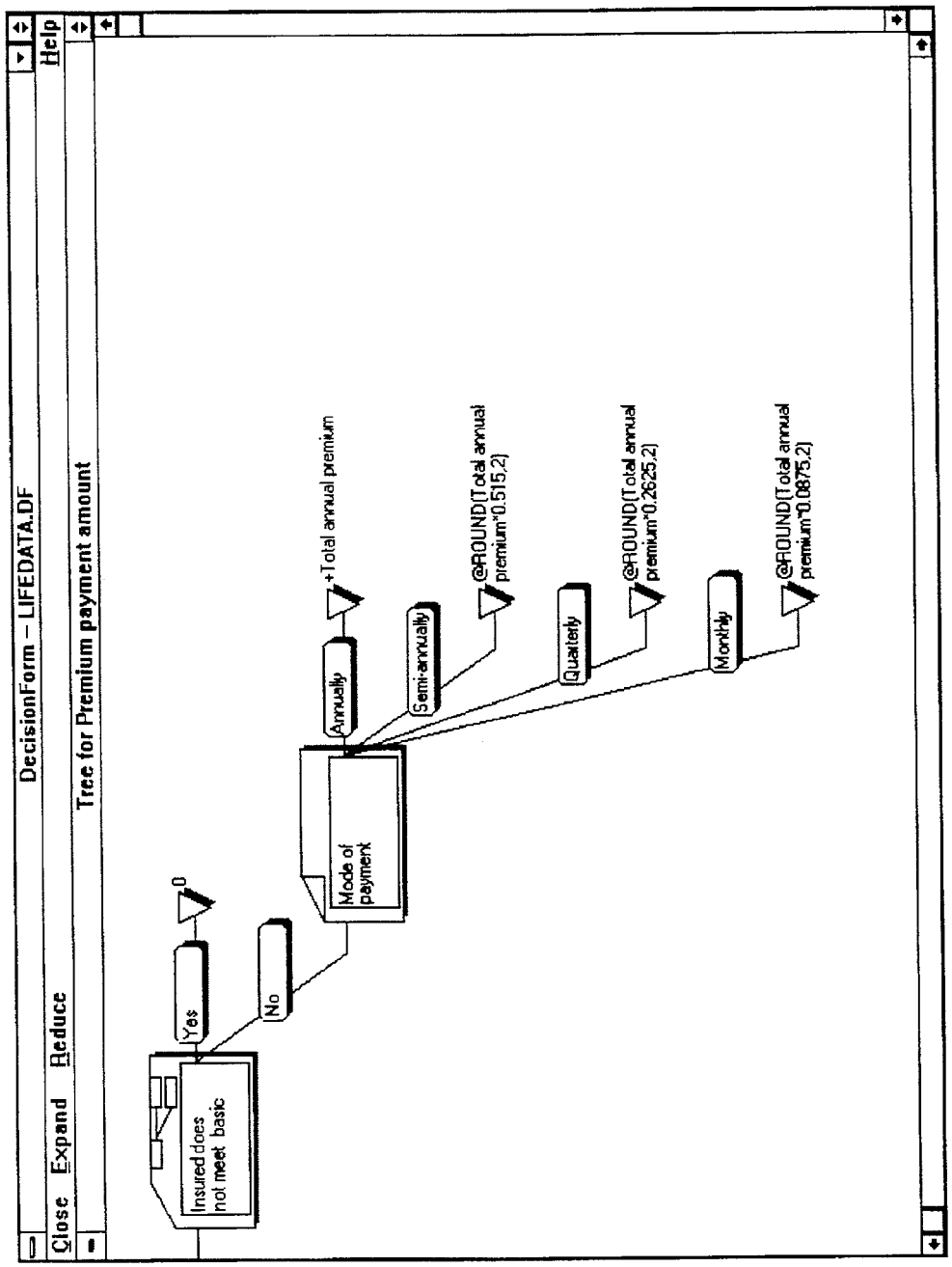

The Life Insurance Application referenced earlier herein, as an example, illustrates several features which are provided by my form tool. FIG. 17 shows the dialog box for attaching context sensitive help to a field using the "Help" command on the "Properties" menu in FIG. 6. In this example, the help for the field called "Proposed Insured" is an elaboration of some information that may be of value to the operator filling out the form.

Figure 20:
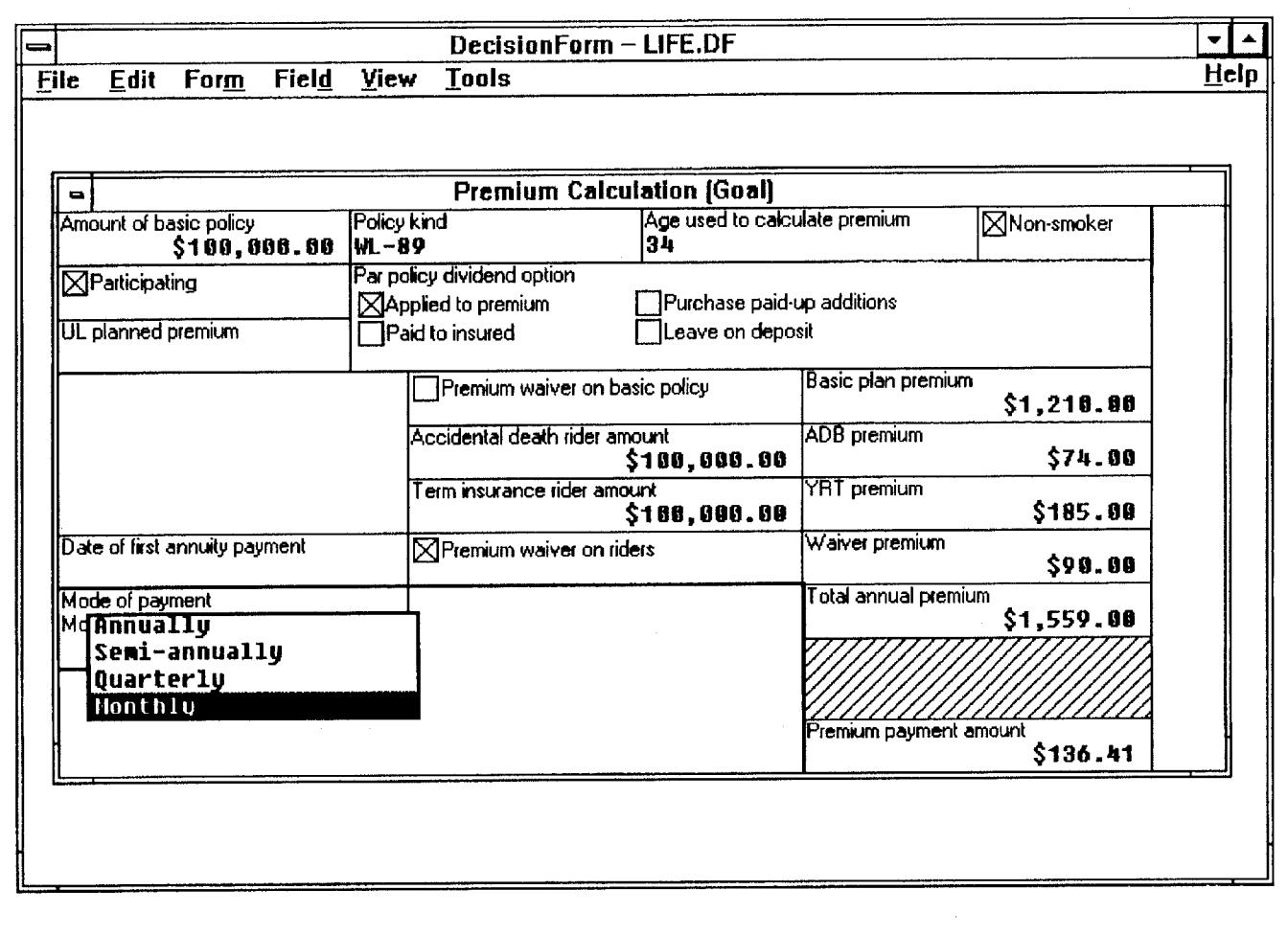

FIG. 18 and 19 illustrate an automatic feature provided in the form tool that places check boxes within the space allotted to a field. In FIG. 18 a vertical space is alloted a field called "Mode of Payment" and the check boxes are displayed accordingly. In FIG. 19 a horizontal field is provided for mode of payment and the check boxes are arranged accordingly. FIG. 20 shows the case where insufficient space is allocated for "mode of payment" and although check boxes are indicated, the system automatically provides a selection list since there is insufficient room for the check boxes. There is always room for the selection list since even as the list grows, scroll bars can be added to the display and an arbitrarily long list can be shown.

Figure 21:
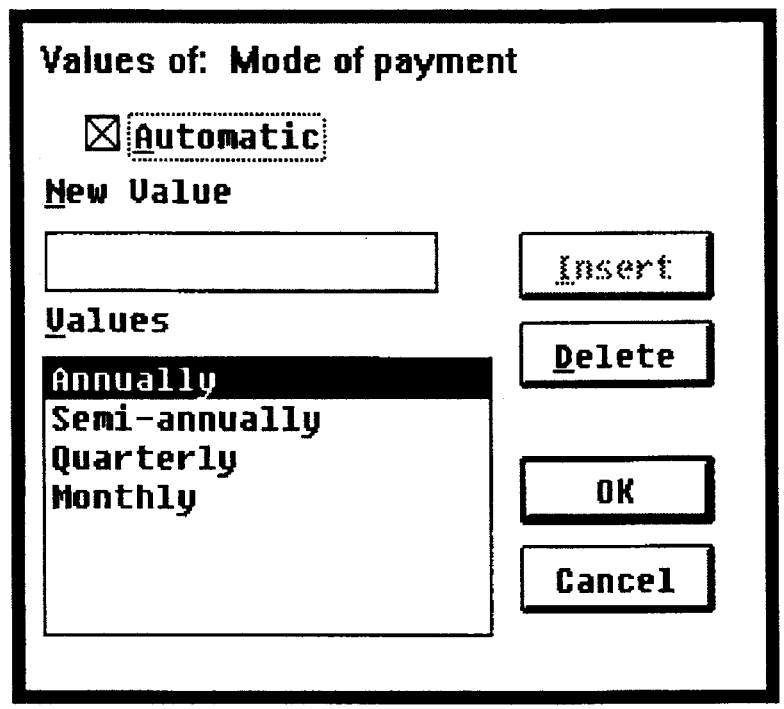
FIG. 21 is a dialog box for automatically or non-automatically specifying values expected for a field.

FIG. 21 shows a dialog box that allows for the automatic generation of the values for fields. This dialog box appears whenever the operator changes the type of a field to either "selection list" or "check box" using the "Field Type" command on the "Properties" menu shown in FIG. 6. The automatic determination of the values looks at values that can be attached from the tree, values that are used in a tree which employs the field for determination of the other tree's value, or finally automatic creation of the values by looking at the values that can be brought from the records of a database. If automatic is not selected, then the new values are manually entered in the edit box under "New Value" and then added to the list in the box called "Values".

Figure 22:
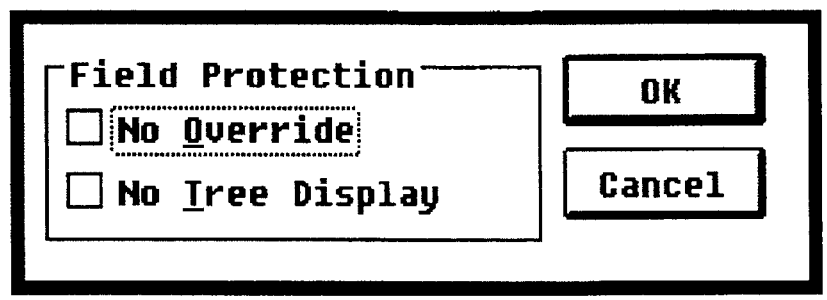
FIG. 22 is a dialog box for specifying field protection.

Another capability of my invention is to provide protection of fields contained on forms and there are two different protection modes possible. FIG. 22 shows the dialog box that can be used to disallow override values using the "Protection" command on the "Properties" menu shown in FIG. 6. The meaning of no override is that the user is not allowed to override a value which has been assigned to the field from a tree or from a database reference. Field protection can also block the ability for the user of the application to observe the decision tree logic for a particular field. Both of these protections are done on a field-by-field basis.

Stack Tool

The Stack Tool, which provides for manipulation of the forms of an application, is a high-level, graphical facility for copying, creating, deleting and arranging forms. Within the stack tool there are specific capabilities that allow application creators to create new forms, change the title of an existing form or change the order of the existing forms within an application. For instance, it is often useful to change the order of forms to move a new form to the top of the stack so that it becomes the goal form when the application is initially loaded into memory.

Figure 23:
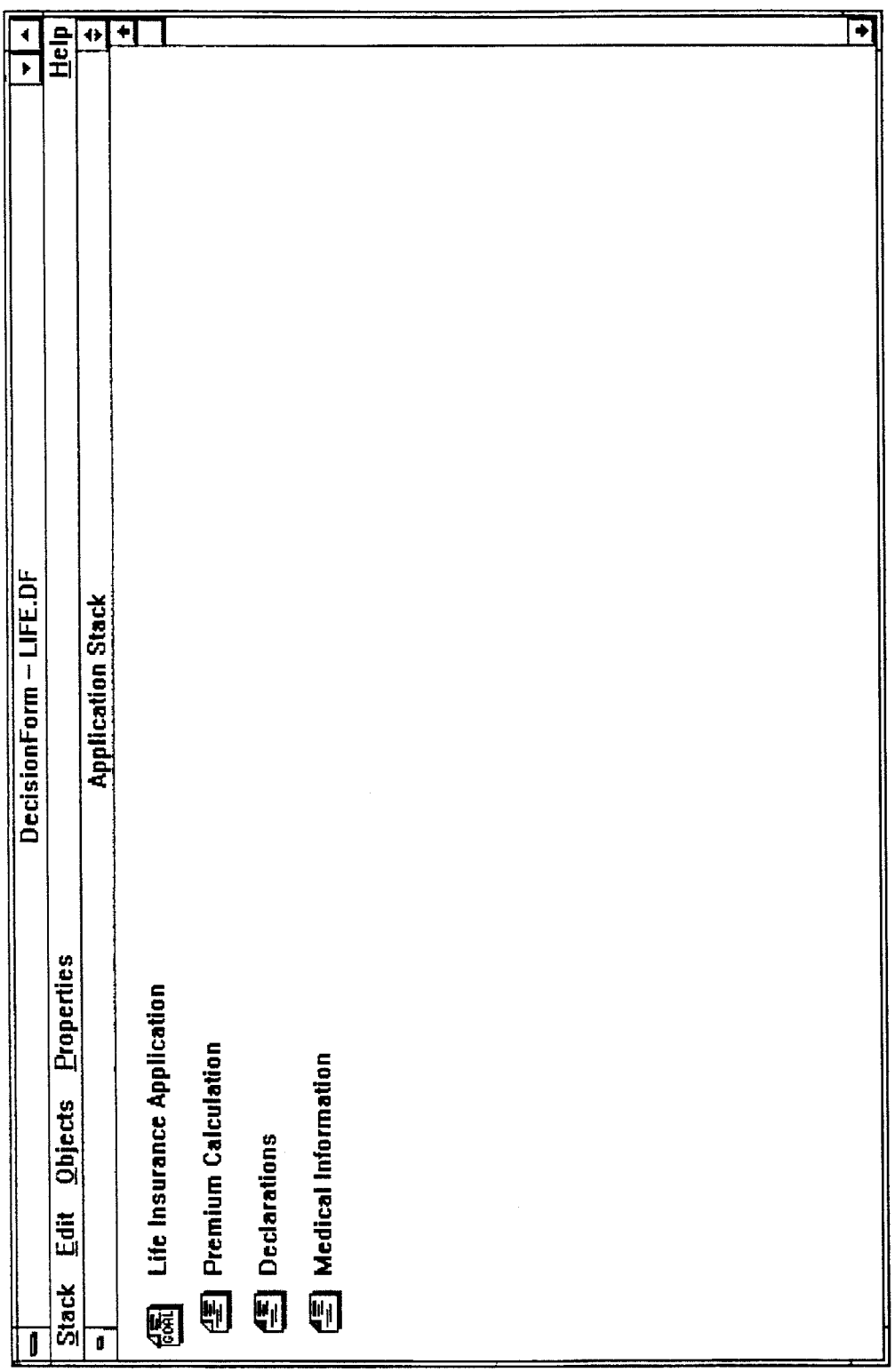
FIG. 23 illustrates a stack tool window with a display of related forms.

The stack for the Life Insurance Application used in the previous description of form completion is depicted in FIG. 23. FIG. 23 depicts a window which is displayed when the stack tool is chosen using the "Stack" command on the "Tools" menu. It shows the four related forms that comprise the "stack" or set of forms for this application. As seen in FIG. 23, the stack for the file Life.DF comprises the goal form and three subsidiary related forms. Of special note in FIG. 23 is the fact that the top form of the stack, in this case the Life Insurance Application form, is depicted as a goal form through the use of a special icon for the top-most form in the stack.

Tree Tool

In my invention, another specialized tool called the Tree Tool is provided in order to create and modify decision trees. The Tree Tool is invoked by the operator by first selecting the field associated with the tree and then using the "Tree" command on the "Tools" menu as shown in FIG. 5 and FIG. 6.

Figure 24:
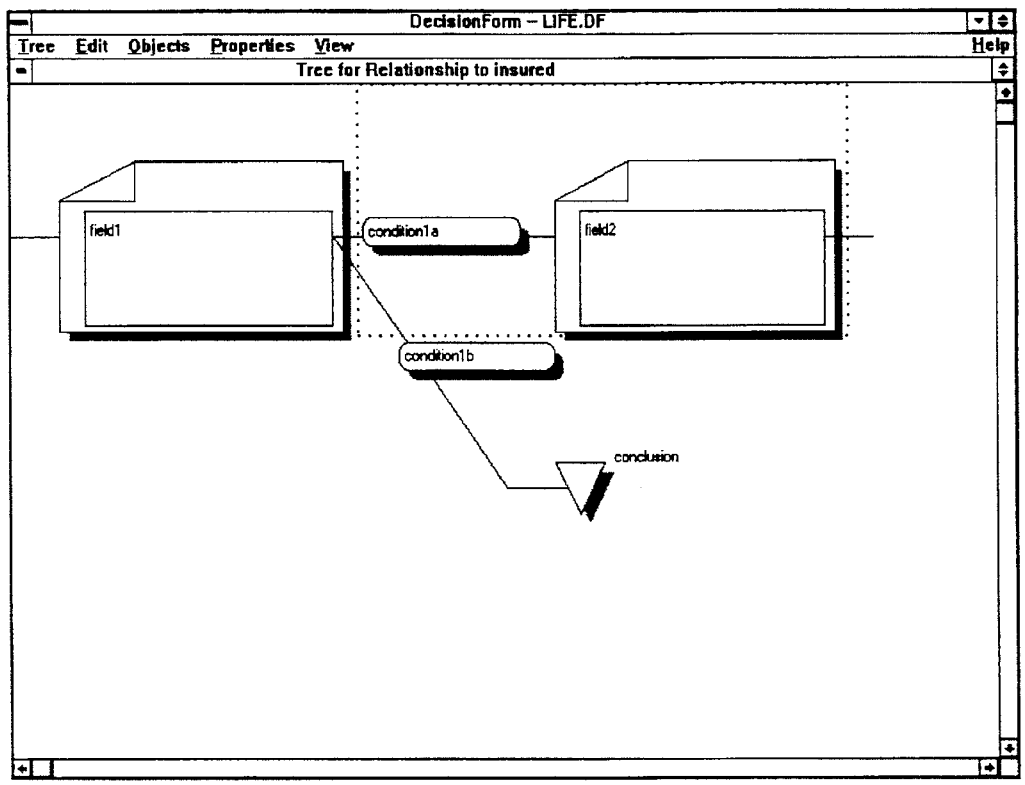
FIG. 24 is a display of a branch object in a tree.

Two basic types of objects can be created using the tree tool. The first object is the branch object which is shown in FIG. 24 highlighted with a broken line. The branch object consists of a condition of the preceding field; in this case, Field 1. The first condition of Field 1, condition 1A, is the condition leading to the highlighted object. The second part of the branch object is the field upon which the new branch will be taken; in this case, Field 2.

Figure 25:
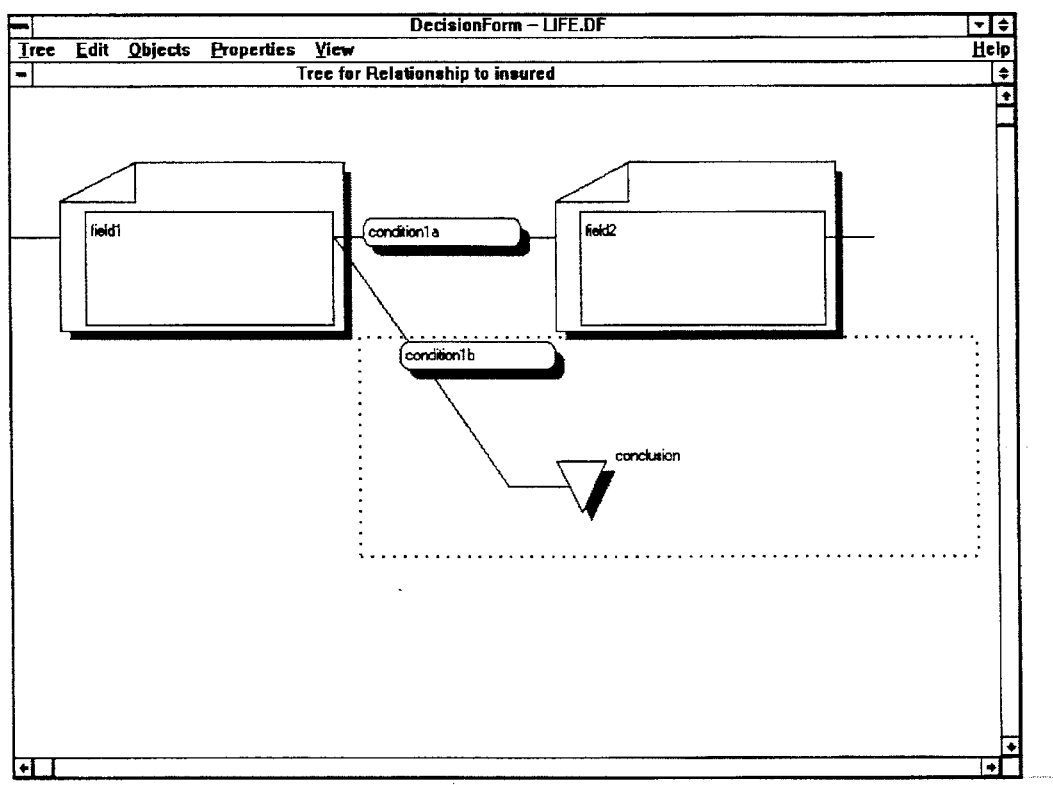
FIG. 25 is a display of a conclusion object in a tree.

FIG. 25 illustrates the conclusion object. The conclusion object is highlighted with a broken line. The conclusion object consists of a condition that the preceding field, again in this case Field 1. The second condition of Field 1, condition 1B, is the condition of this object. The second part of the conclusion object is the conclusion itself; in this case, just indicated with the word "Conclusion". Conclusions can be text, fields, functions, or combinations of the proceeding in expressions connected with operators using spreadsheet syntax.

Figure 26:
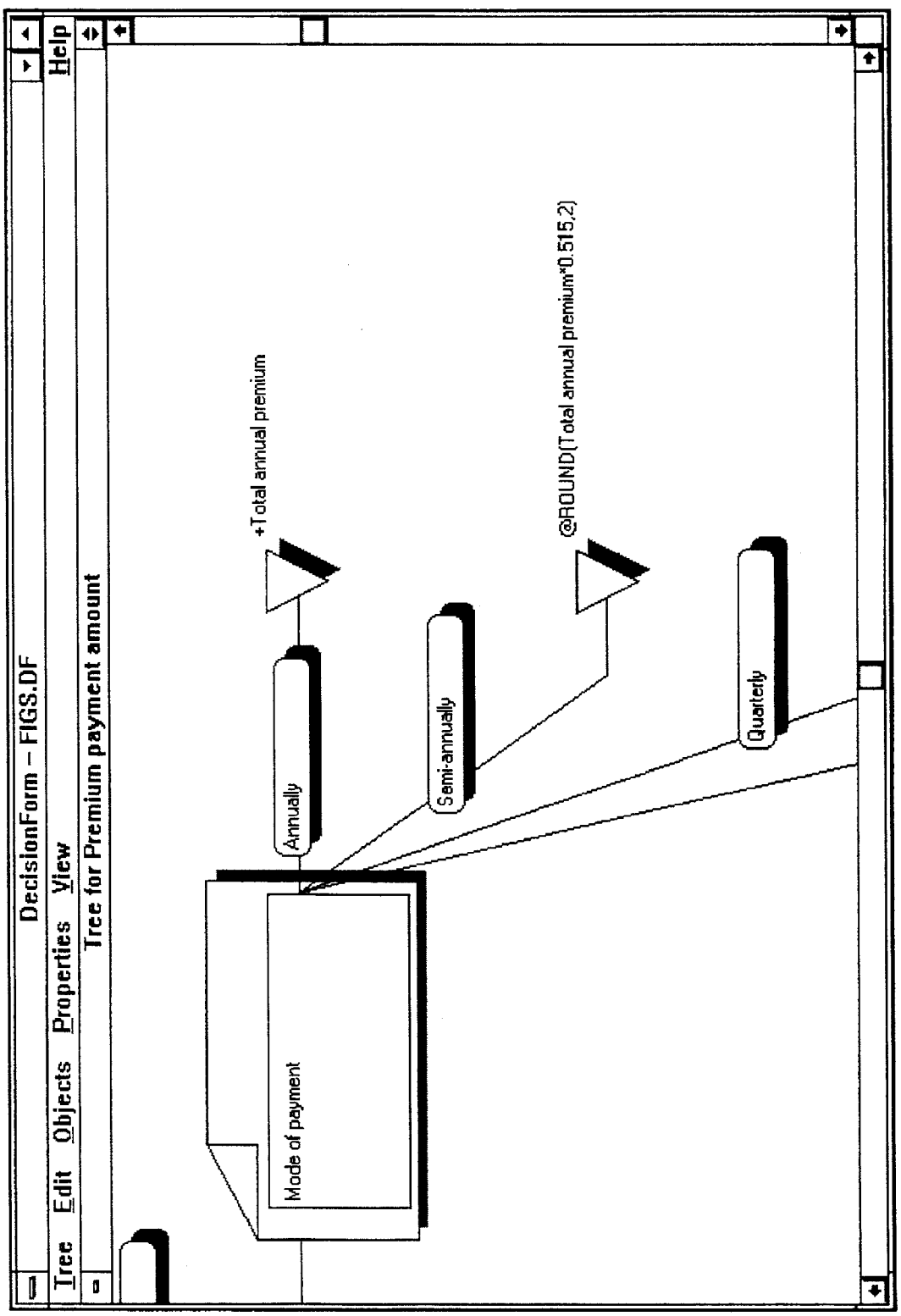
FIG. 26 illustrates multiple branches and expressions for calculating results for each branch.

FIG. 26 shows multiple branches from an example field called "Mode of Payment". If mode of payment is "annual", the value for the premium payment amount is the "total annual premium" as indicated in the conclusion for that branch. If the payments are made "semi-annually", the expression uses the function @ROUND of the total annual premium multiplied times the factor that it adjusts it for the fact that there are two payments made during the year (each equal to about one-half or 0.515 of the annual amount). The @ROUND function also requires specification of the number of decimal places. In this example, the value set at two places gives a dollar and cents amount. My system provides a complete set of built-in functions, such as @ROUND, which can be used within tree conditions and conclusions to calculate values based on field values. These functions are listed in Appendix A under the heading "IDFunction".

Figure 27:
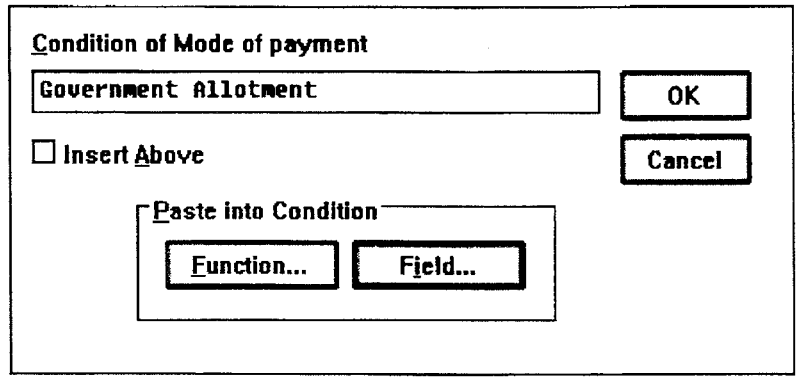
FIG. 27 is a dialog box for specifying conditions and conclusions in a tree.
Figure 28:
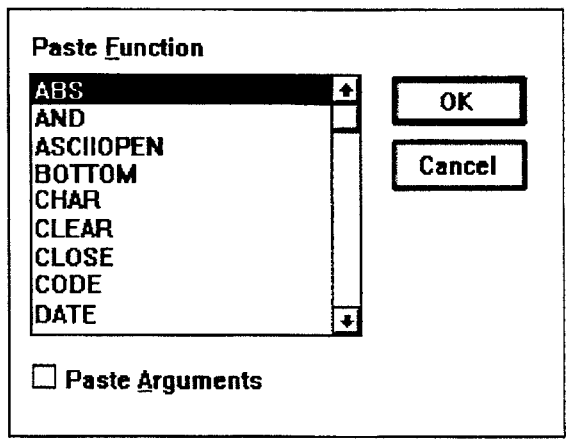
FIG. 28 is a dialog box for pasting functions into an expression.
Figure 29:
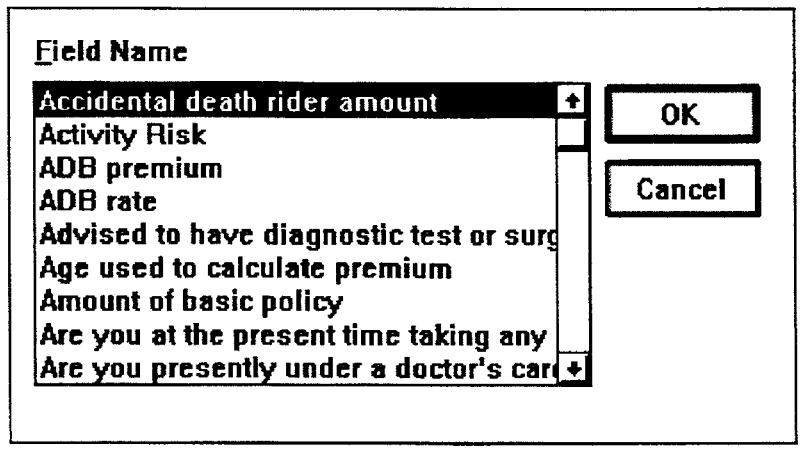
FIG. 29 is a dialog box for pasting field names into an expression.

A dialog box like that shown in FIG. 27 is displayed as a part of the specification of both conditions and conclusions. This dialog box appears when the operator selects either the "Condition" or "Conclusion" command on the "Properties" menu shown in FIG. 7. The condition or conclusion expression is contained within the edit window in the upper part of the box. There are options to assist the entry process by providing pasting of functions and fields into the condition. For the case of pasting functions, FIG. 28 shows a portion of the list of functions available in alphabetical order including an option to paste in descriptive arguments for the functions. FIG. 29 shows the dialog box allowing the pasting of fields. This is simply a listing of all of the fields currently defined in the application thereby saving a number of keystrokes for the choice of a field from the list of all possible fields available.

Figure 30:
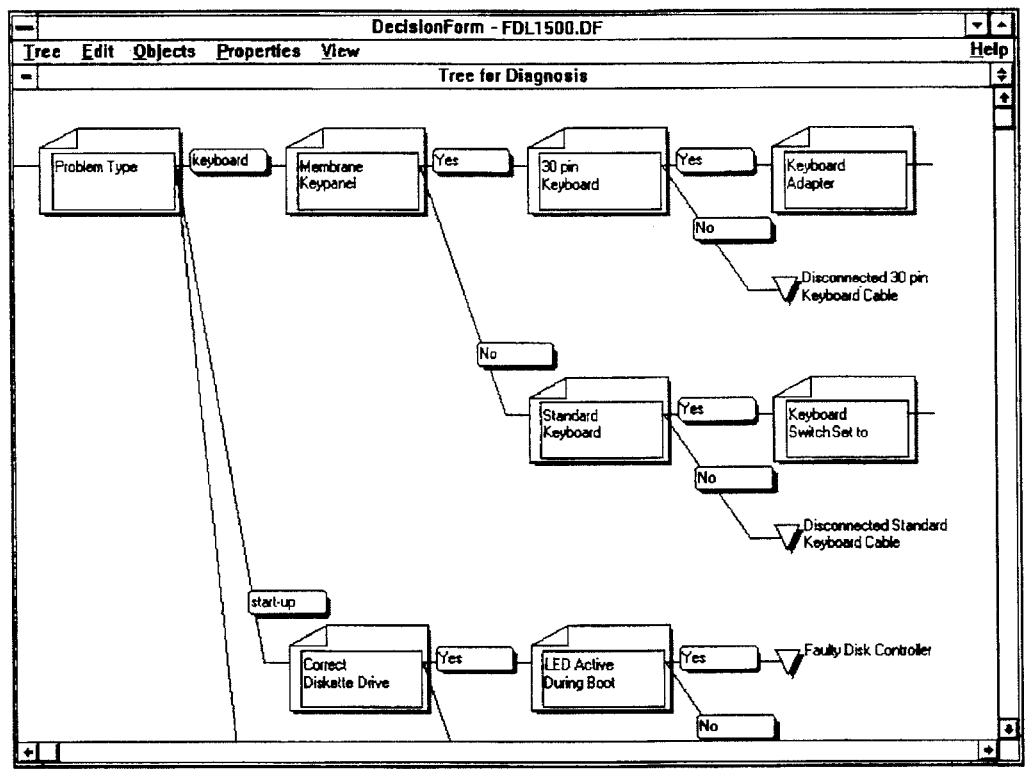
FIG. 30 illustrates a larger perspective view of a tree shown in FIG. 31.
Figure 31:
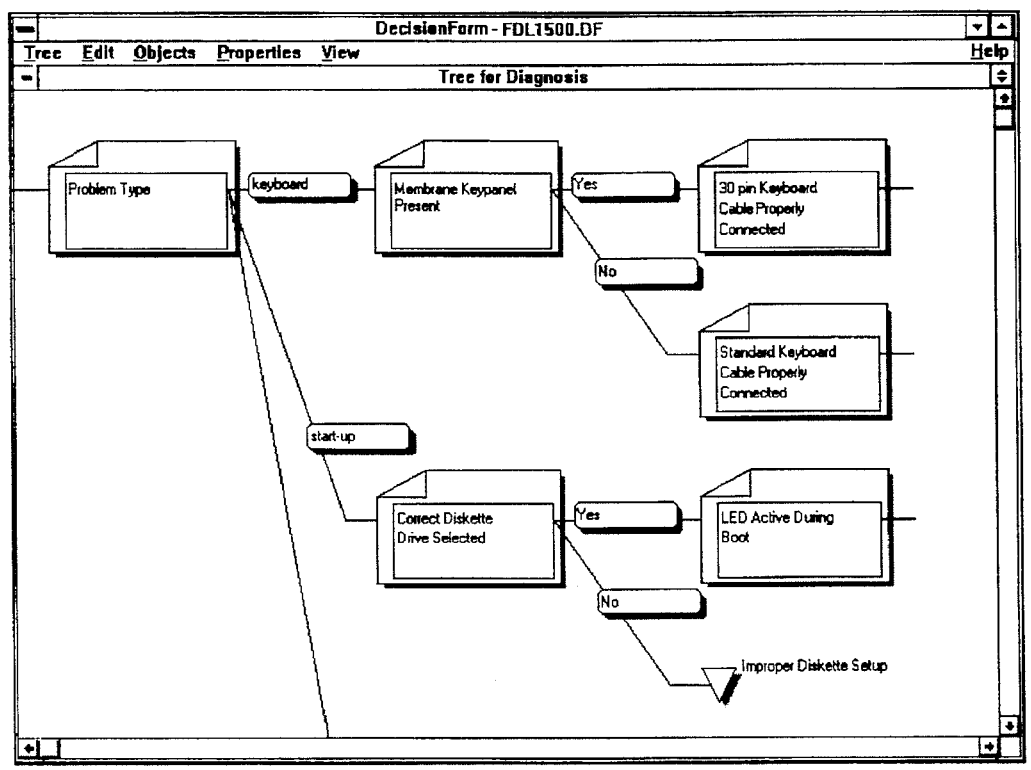
FIG. 31 illustrates a more detailed view of a portion of the tree in FIG. 30.

My invention also provides a very innovative approach to the display of arbitrarily large trees in a fixed-size region, such as on a computer display. FIGS. 30 and 31 both display the same decision tree but at two different levels of magnification. FIG. 30 shows a larger view than that shown in FIG. 31. In FIG. 31 the fields, the branches, the conclusions are arranged with spacing to maximize the amount of information displayed. If a more magnified view is selected, like that of FIG. 31, the branches and conclusions are rearranged with closer spacing in order to fill in some of the blank space that would be available if the prior spatial arrangement of FIG. 30 were maintained.

To maximize the display of tree objects on a fixed size display, my system first determines how many tree objects to display in one horizontal row of the display. The operator can control the number of tree objects displayed in a horizontal row by using the "Expand" command on the "View" menu to decrease the number of tree objects or the "Reduce" command on the "View" menu to increase the number of tree objects.

Once the number of tree objects in a horizontal row is determined, my system next determines the number of tree objects that can be displayed in a vertical column while maintaining the proper aspect ratio of tree objects. My system then displays one horizontal row of tree objects at a time without displaying any objects that are beyond the rightmost edge of the display. Any horizontal rows which contain only tree objects beyond the rightmost edge of the display are not displayed. The result of eliminating these rows is that the display surface is more densely packed with at least one tree object in each horizontal row. This eliminates much of the "white space" that would occur when displaying portions of a large tree near the root of the tree.

Figure 32:
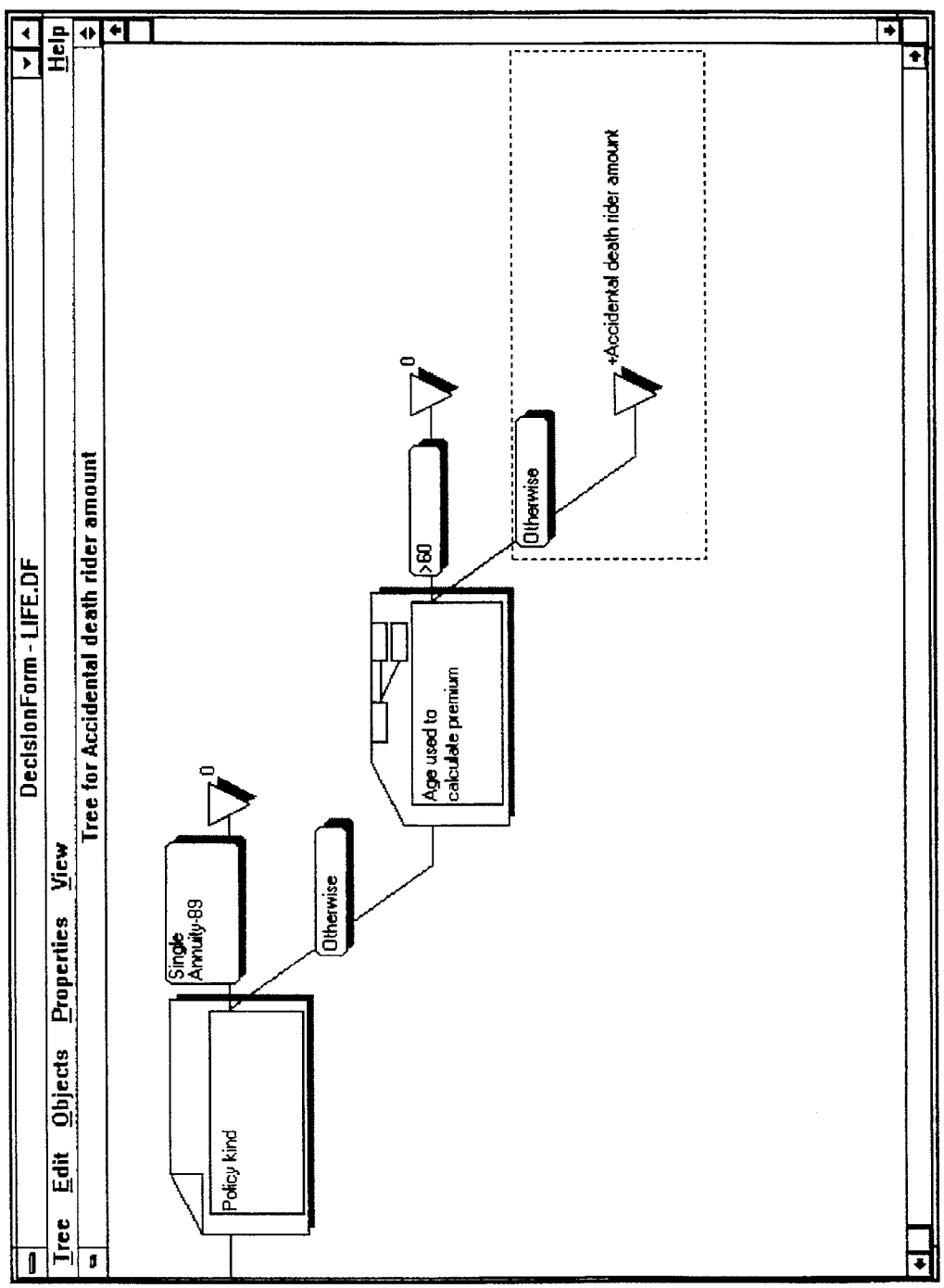
FIG. 32 illustrates a self-referencing tree.

FIG. 32 illustrates the use of a tree that has as one of its possible conclusions the value of the field for which the tree is being determined. The ability of a tree for a particular field to reference itself is useful in providing the user of the system with values determined by the tree if the tree has anticipated the values of interest. But in the case where the values have not been anticipated by the tree, the self-reference allows the field to be prompted so that the operator can enter the information directly.

Links Tool

Figure 33:
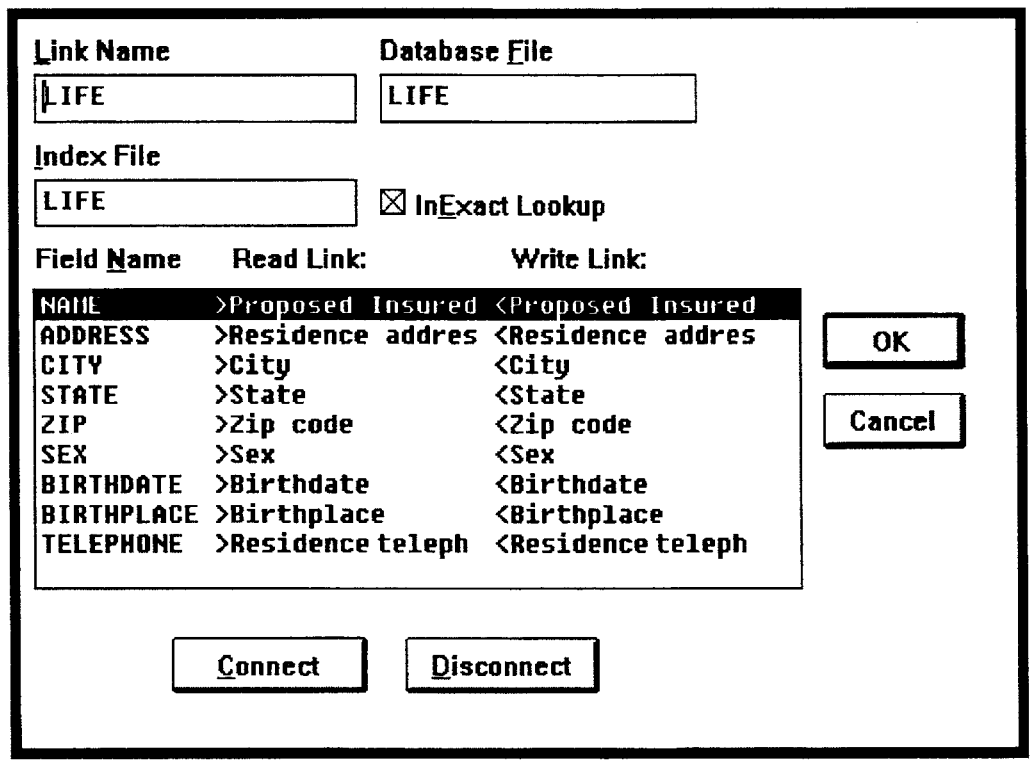
FIG. 33 is a dialog box for establishing links between fields in the form system and fields in related database(s)

In my invention, the Links Tool provides an ability to relate the fields on the form system with the fields in related database(s). FIG. 33 shows the dialog box for establishing both read and write links between applications and the databases. The Links Tool dialog can be entered from either form completion mode or from the Form Tool by using the "Links" command on the "Tools" menu.

The Links Tool dialog shown in FIG. 33 allows the operator to associate database fields (listed on the left side of the dialog box) with fields defined within my form system. This association can be made for both the purpose of reading data from the database and writing data into the database. FIG. 33 is from the Life Insurance Application example used earlier and shows how an applicant's address, city, state, etc. can be obtained from a database given the applicant's name.

Figure 34:
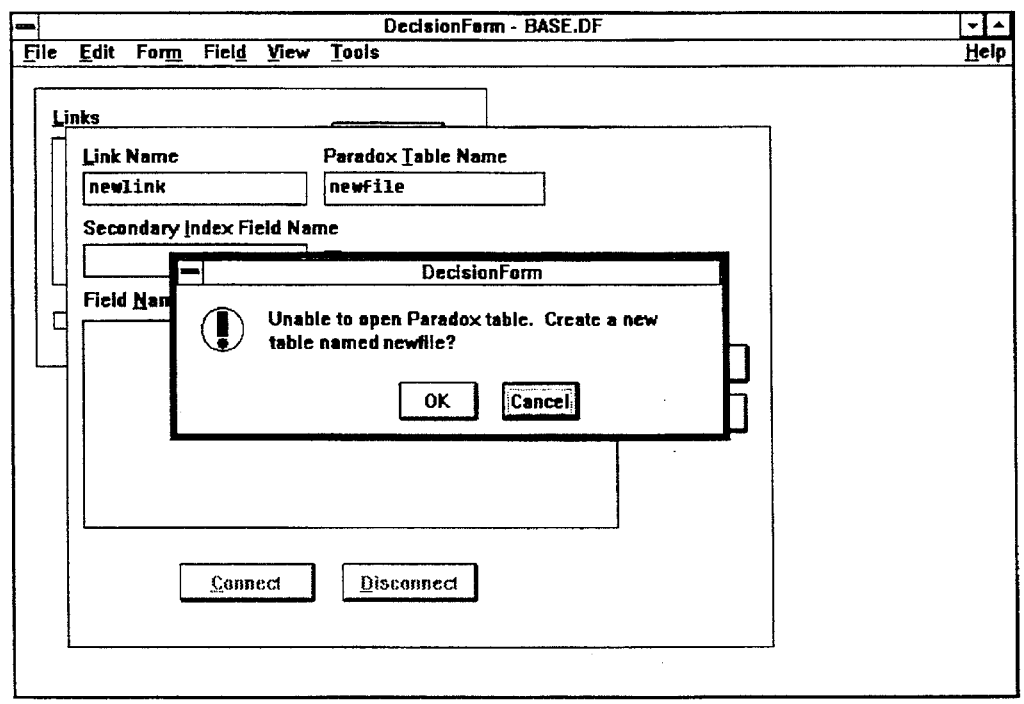
FIG. 34 is a dialog box for selecting the option to create a new database file when there is no established file.

FIG. 34 shows the ability of my invention to take care of a case where there is not an established database in place corresponding to the values of the fields within my forms system. In the illustration of FIG. 34, a link named "New Link" has been attempted with a database; in this case, a database table named "New File". The system was unable to open that file because that file did not exist and the option provided in the dialog box allows the operator to create a new database table with this name. My system uses the properties of the fields as defined by the operator to create database fields of the appropriate size and type.

My invention has been described with particular attention to its preferred embodiment; however, it should be understood that variations and modifications within the spirit and scope of the invention may occur to those skilled in the art to which the invention pertains.

What is claimed is:

1. A goal oriented electronic form system comprising:
   means for generating and means for using form data files which define:
   a graphical image of at least one goal oriented form for display on a monitor, said form including at least one field for storing information;
   a graphical image of at least one decision tree, said at least one decision tree defining specific operations to be performed by the system in response to storage of information at a selected one of said at least one field;
   means for generating form data files comprising means for selectively defining data links between selected fields of one or more forms and a variety of different external data sources, said means for generating form data files including means for reading data from the sources into fields and for writing information from fields to the sources;
   means, responsive to a user request, for establishing a link to an external data source; and
   means for creating the external data source in the event that an appropriate one does not already exist, the source being automatically created with fields which correspond in name and characteristics to the selected fields of at least one form named in said link request.

2. A goal oriented electronic form system in accordance with claim 1 wherein:
   each said decision tree comprises branch objects and conclusion objects; and wherein
   said objects define selected ones of logical relations and computational operations for achieving a goal, whereby the system prescribes a sequence of prompting within a form and among forms of a set of forms for achieving said goal.

3. A goal oriented electronic form system in accordance with claim 1 wherein:
   said data links are defined as being selected ones of reading links for reading data from the sources and writing links for writing information to the sources.

4. A goal oriented electronic form system in accordance with claim 1 wherein:
   said variety of data sources include a selected one of a data base file and an ASCII data file.

5. A goal oriented electronic form system in accordance with claim 1 wherein:
   said data links include means for exchanging information with another application program.

6. A goal oriented electronic form system in accordance with claim 1 wherein:
   said means for generating includes first interactive means for visually creating said form on said monitor and second interactive means for visually creating said at least one decision tree on said monitor.

7. A goal oriented electronic form system in accordance with claim 1 wherein:

said means for defining data links includes interactive means for specifying links between said fields of forms and said data sources.

8. A goal oriented electronic form system in accordance with claim 1 wherein:

said system comprises a form creation mode of operation for generating and using said graphical images of at least one goal oriented form and at least one decision tree; and a run time mode of operation, whereby the system prevents end user alteration of said form data files.

9. A goal oriented electronic form system in accordance with claim 8 wherein:

said run time mode of operation comprises means for selecting a field of a form; and means for selectively displaying a decision tree assigned to that field.

* * * * *